United States Patent
Hirano et al.

(10) Patent No.: US 11,829,472 B2
(45) Date of Patent: Nov. 28, 2023

(54) ANOMALOUS VEHICLE DETECTION SERVER AND ANOMALOUS VEHICLE DETECTION METHOD

(71) Applicant: Panasonic Intellectual Property Corporation of America, Torrance, CA (US)

(72) Inventors: Ryo Hirano, Osaka (JP); Takeshi Kishikawa, Osaka (JP); Yoshihiro Ujiie, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 284 days.

(21) Appl. No.: 17/380,228

(22) Filed: Jul. 20, 2021

(65) Prior Publication Data

US 2021/0349997 A1    Nov. 11, 2021

Related U.S. Application Data

(63) Continuation of application No. PCT/JP2020/032208, filed on Aug. 26, 2020.

(30) Foreign Application Priority Data

Aug. 30, 2019    (WO) .................. PCT/JP2019/034264

(51) Int. Cl.
*G06F 21/14*    (2013.01)
*G06F 21/56*    (2013.01)
*G06F 21/55*    (2013.01)

(52) U.S. Cl.
CPC ............ *G06F 21/56* (2013.01); *G06F 21/552* (2013.01)

(58) Field of Classification Search
CPC ........ G06F 21/56; G06F 21/552; G06F 21/14; H04L 63/1425; H04L 67/12
See application file for complete search history.

(56) References Cited

U.S. PATENT DOCUMENTS

| 2014/0328352 A1 | 11/2014 | Mabuchi et al. |
| 2017/0093902 A1 | 3/2017 | Roundy et al. |

(Continued)

FOREIGN PATENT DOCUMENTS

| JP | 5664799 B2 | 2/2015 |
| JP | 2017-005422 A | 1/2017 |

(Continued)

OTHER PUBLICATIONS

S. Bellovin, "Guidelines for Specifying the Use of IPsec Version 2", Network Working Group, RFC: 5406, BCP: 146, Best Current Practice, Columbia University, Feb. 2009, pp. 1-13.

(Continued)

*Primary Examiner* — Ali S Abyaneh
(74) *Attorney, Agent, or Firm* — Greenblum & Bernstein, P.L.C.

(57) ABSTRACT

An anomalous vehicle detection server includes an anomaly score calculator that detects a suspicious behavior different from a predetermined driving behavior based on pieces of vehicle information that are received from a plurality of vehicles, respectively, and are each based on a vehicle log including the content of an event that has occurred in a vehicle system provided in the vehicle, and acquires an anomaly score of each of the plurality of vehicles that indicates a likelihood that reverse engineering is performed on the vehicle; and an anomalous vehicle determiner that determines whether one vehicle of the plurality of vehicles is an anomalous vehicle based on the anomaly score of the (Continued)

one vehicle and a statistical value of the anomaly scores of two or more vehicles of the plurality of vehicles.

17 Claims, 26 Drawing Sheets

(56) References Cited

U.S. PATENT DOCUMENTS

| | | | | |
|---|---|---|---|---|
| 2018/0196941 | A1* | 7/2018 | Ruvio | H04L 63/0227 |
| 2018/0295147 | A1* | 10/2018 | Haga | H04L 12/40 |
| 2019/0140778 | A1 | 5/2019 | Kishikawa et al. | |
| 2020/0216027 | A1* | 7/2020 | Deng | H04L 63/1416 |
| 2021/0021610 | A1* | 1/2021 | Ahire | H04L 67/12 |

FOREIGN PATENT DOCUMENTS

| | | |
|---|---|---|
| JP | 2017-111796 A | 6/2017 |
| JP | 2018-530066 A | 10/2018 |
| WO | 2017/058313 A1 | 4/2017 |
| WO | 2018/168291 A1 | 9/2018 |

OTHER PUBLICATIONS

International Search Report (including English Language Translation), dated Nov. 19, 2019 by the Japan Patent Office (JPO), in International Application No. PCT/JP2019/034264.

International Search Report (including English Language Translation), dated Nov. 24, 2020 by the Japan Patent Office (JPO), in International Application No. PCT/JP2020/032208.

* cited by examiner

FIG. 5

| Vehicle log number | Vehicle identifier | Vehicle type | Time | Vehicle position information | Event name |
|---|---|---|---|---|---|
| 1 | A1 | A | TA11 | X1,Y1 | Network device registration |
| 2 | A1 | A | TA12 | X1,Y1 | Network device deletion |
| 3 | A1 | A | TA13 | X1,Y1 | Internet disconnection |
| 4 | A1 | A | TA14 | X1,Y1 | Internet connection |
| 5 | A2 | A | TA21 | X1,Y1 | VPN disconnection |
| 6 | A2 | A | TA22 | X1,Y1 | VPN connection |
| 7 | A2 | A | TA23 | X1,Y3 | Vehicle control function activation |
| 8 | A2 | A | TA24 | X1,Y4 | Vehicle control function activation |
| 9 | B1 | B | TB11 | X2,Y2 | System error occurrence |
| 10 | B1 | B | TB12 | X2,Y2 | System error resolution |
| 11 | B1 | B | TB13 | X2,Y2 | Vehicle control function activation |
| 12 | B1 | B | TB14 | X2,Y2 | Vehicle control function activation |
| ... | ... | ... | ... | ... | ... |
| C1 | C1 | C | TC11 | X3,Y3 | Access to address A |
| C2 | C1 | C | TC12 | X3,Y3 | Access from address B |
| C3 | C1 | C | TC13 | X3,Y3 | System login |
| C4 | C1 | C | TC14 | X4,Y4 | Increase in file count or process count |

FIG. 6

| Anomaly rule number | Anomaly rule content | Period | Number of occurrences | Anomaly score | Anomaly category |
|---|---|---|---|---|---|
| 1 | Internet device connection | 1 hour | 4 | +1 | Network analysis |
| 2 | Internet or VPN shutdown | 10 minutes | 1 | +1 | Network analysis |
| 3 | Change in address accessed | — | 1 | +1 | Network analysis |
| 4 | Change in address accessed from | — | 1 | +1 | Network analysis |
| 5 | Vehicle control function activation | 1 hour | 10 | +2 | System analysis |
| 6 | System error occurrence | 24 hours | 2 | +1 | System analysis |
| 7 | System error resolution | — | 1 | +3 | System analysis |
| 8 | System login | — | 1 | +5 | System analysis |
| ... | ... | | | ... | ... |
| N | Increase in file count or process count | — | 1 | +1 | System analysis |

FIG. 7

| Exclusion rule number | Position information | Effective period | Content | To-be-excluded anomaly rule |
|---|---|---|---|---|
| 1 | X2, Y2 | — | Test course A | Vehicle control function activation |
| 2 | X5, Y5 | — | Dealership A | System error resolution |
| 3 | X6, Y6 | — | Repair service provider A | System error resolution |
| 4 | Japan | T3-T4 | Software update A | Increase in file count or process count |
| 5 | North America | T5-T6 | Software update B | Increase in file count or process count |
| ... | ... | ... | ... | ... |
| M | X4, X4 | — | Tunnel A | Internet or VPN shutdown |

FIG. 8

| Anomaly rule number | Anomaly score by vehicle | | | | | Anomaly score by vehicle type | | | Anomaly score by area | | |
|---|---|---|---|---|---|---|---|---|---|---|---|
| | A1 | A2 | B1 | ... | C1 | A | B | C | X1,Y1 | X2,Y2 | X3,Y3 |
| 1 | 0 | 0 | 0 | ... | 0 | 0 | 0 | 0 | 0 | 0 | 0 |
| 2 | 1 | 1 | 0 | ... | 0 | 1 | 0 | 0 | 1 | 0 | 0 |
| 3 | 0 | 0 | 0 | ... | 1 | 0 | 0 | 1 | 0 | 0 | 0 |
| 4 | 0 | 0 | 0 | ... | 1 | 0 | 0 | 1 | 0 | 0 | 0 |
| 5 | 0 | 2 | 0 | ... | 0 | 1 | 0 | 0 | 0 | 1 | 0 |
| 6 | 0 | 0 | 0 | ... | 0 | 0 | 0 | 0 | 0 | 0.5 | 0 |
| 7 | 0 | 0 | 1 | ... | 0 | 0 | 1 | 0 | 0 | 0 | 0 |
| 8 | 0 | 0 | 0 | ... | 5 | 0 | 0 | 1 | 0 | 0 | 0 |
| ... | ... | ... | ... | ... | ... | ... | ... | ... | ... | ... | ... |
| N | 0 | 0 | 0 | ... | 0 | 0 | 0 | 0 | 0 | 0 | 0 |
| Last anomaly date and time | TN1 | TN2 | TN3 | ... | TN4 | — | — | — | — | — | — |

FIG. 9

| Countermeasure rule number | Anomaly category | Anomaly score | Countermeasure rule content |
|---|---|---|---|
| 1 | Network analysis | ≥30 | Shut down network interface |
| | | < 30, ≥ 20 | Limit address accessed and address accessed from |
| | | < 20, ≥ 10 | Limit number of network connection device |
| | | ≥ 1 | Alert driver |
| 2 | System analysis | ≥30 | Stop vehicle control function |
| | | < 30, ≥ 20 | Increase frequency of transmitting vehicle log |
| | | < 20, ≥ 10 | Increase number of types of vehicle logs |
| | | ≥ 1 | Alert driver |

FIG. 10

| Anomaly score | Vehicle identifier |
|---|---|
| 100 | H1 |
| 90 | H2 |
| 80 | H3 |
| ... | ... |
| 1 | H4 |

FIG. 12

| Phase | Reconnaissance | Weaponization | Delivery | Exploitation | Installation | C & C | Action on objective |
|---|---|---|---|---|---|---|---|
| Vehicle A1 | ☒ | | ☒ | | | | |

ANOMALOUS VEHICLE DETECTION SERVER AND ANOMALOUS VEHICLE DETECTION METHOD

CROSS REFERENCE TO RELATED APPLICATIONS

This is a continuation application of PCT International Application No. PCT/JP2020/032208 filed on Aug. 26, 2020, designating the United States of America, which is based on and claims priority of PCT International Application No. PCT/JP2019/034264 filed on Aug. 30, 2019. The entire disclosures of the above-identified applications, including the specifications, drawings and claims are incorporated herein by reference in their entirety.

FIELD

The present disclosure relates to an anomalous vehicle detection server and an anomalous vehicle detection method.

BACKGROUND

Nowadays, many devices called electronic control units (hereinafter, ECUs) are disposed in a system within an automobile. The network that connects these ECUs is called an in-vehicle network. There are many in-vehicle network standards, and a standard called a Controller Area Network (hereinafter, CAN (registered trademark, hereinafter the same)) is one of the most widely adopted in-vehicle network standards. Moreover, with the spread of automatic driving or connected cars, in-vehicle network traffic is expected to increase, and in-vehicle Ethernet (registered trademark, hereinafter the same) is becoming widespread.

Meanwhile, there has been a reported threat that enters an in-vehicle system to gain unauthorized control of the vehicle. In addressing such a threat, Non Patent Literature 1 discloses a method of preventing unauthorized control to be gained by communication performed by an unauthorized node, and this method uses encrypted communication that has been used in conventional Internet Protocol (IP) communication. In addition, Patent Literature 1 discloses a method of detecting anomalous communication in an in-vehicle network and blocking an unauthorized frame.

CITATION LIST

Patent Literature

PTL 1: Japanese Patent No. 5664799

Non Patent Literature

NPL 1: RFC 5406: Guidelines for Specifying the Use of IPsec Version 2, February 2009.

SUMMARY

Technical Problem

Despite the above, since the method disclosed in Non Patent Literature 1 uses encrypted communication, this necessitates encryption and decryption processing at a transmitting and receiving node and causes an overhead. Moreover, managing keys to be used in the encrypted communication becomes important in the stated method, and if the control of an ECU is taken over or if a key leaks, this allows for unauthorized control through transmission of an unauthorized frame. Furthermore, the method disclosed in Patent Literature 1 merely provides a countermeasure against an anomaly that occurs in response to transmission of an unauthorized frame and does not necessarily prevent an attack. In this manner, there is still room for improvement in the security of an in-vehicle network.

Accordingly, the present disclosure provides an anomalous vehicle detection server and an anomalous vehicle detection method that can further increase the security of an in-vehicle network.

Solution to Problem

An anomalous vehicle detection server according to one aspect of the present disclosure includes: an anomaly score acquirer that detects a suspicious behavior different from a predetermined driving behavior based on pieces of vehicle information received from a plurality of vehicles, respectively, and acquires an anomaly score of each of the plurality of vehicles, the anomaly score indicating a likelihood that reverse engineering has been performed on the vehicle, the pieces of vehicle information each being based on a vehicle log including content of an event that has occurred in a vehicle system; and an anomalous vehicle determiner that determines whether one vehicle of the plurality of vehicles is an anomalous vehicle based on the anomaly score of the one vehicle and a statistical value of the anomaly scores of two or more vehicles of the plurality of vehicles.

An anomalous vehicle detection method according to one aspect of the present disclosure includes: detecting a suspicious behavior different from a predetermined driving behavior based on pieces of vehicle information received from a plurality of vehicles, respectively, and acquiring an anomaly score of each of the plurality of vehicles, the anomaly score indicating a likelihood that reverse engineering is performed on the vehicle, the pieces of vehicle information each being based on a vehicle log including content of an event that has occurred in a vehicle system provided in the vehicle; and determining whether one vehicle of the plurality of vehicles is an anomalous vehicle based on the anomaly score of the one vehicle and a statistical value of the anomaly scores of two or more vehicles of the plurality of vehicles.

Advantageous Effects

The anomalous vehicle detection server and so on according to one aspect of the present disclosure can further increase the security of an in-vehicle network.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is a diagram illustrating an example of a vehicle log according to the embodiment.

FIG. 6 is a diagram illustrating an example of an anomaly rule according to the embodiment.

FIG. 7 is a diagram illustrating an example of an exclusion rule according to the embodiment.

FIG. 8 is a diagram illustrating an example of an anomaly score according to the embodiment.

FIG. 9 is a diagram illustrating an example of a countermeasure rule according to the embodiment.

FIG. 10 is a diagram illustrating an example of an anomaly score list display screen according to the embodiment.

FIG. 12 is a diagram illustrating an example of an anomaly hierarchy display screen according to the embodiment.

Figure 1:
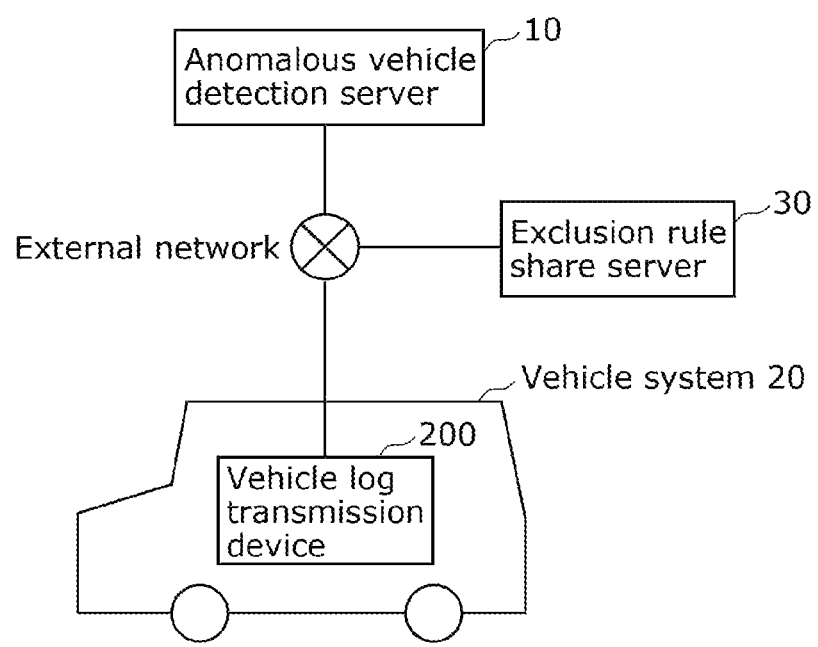
FIG. 1 is an overall configuration diagram of an anomalous vehicle detection system according to an embodiment.

DESCRIPTION OF EMBODIMENTS (Underlying Knowledge Forming Basis of the Present Disclosure)

Prior to describing the embodiment and so on according to the present disclosure, the underlying knowledge forming the basis of the present disclosure will be described.

As described above, the techniques disclosed in Patent Literature 1 and Non Patent Literature 1 have room for improvement in terms or increasing the security of an in-vehicle network.

Typically, an attacker who tries to gain unauthorized control of a vehicle performs in advance reverse engineering on the in-vehicle network by, for example, investigating frames for gaining unauthorized control of the vehicle. If the attacker's activity in the stage of investigating the frames in the in-vehicle network can be captured, this stage of investigating the frames can be seen as a sign of an attack, and an action can be taken to interfere with the investigation performed by the attacker or to increase the monitoring of the vehicle of interest.

Accordingly, the present inventors have diligently contemplated anomalous vehicle detection servers and so on that can capture the activities of an attacker in the stage of investigating an in-vehicle network and conceived of an anomalous vehicle detection server and so on described below. For example, the present inventors have found that the security of an in-vehicle network can be increased effectively by monitoring vehicle logs of a plurality of vehicles on a server, capturing a vehicle behavior that is different from a predetermined behavior (e.g., a normal behavior) and occurs due to the reverse engineering performed by an attacker as a suspicious behavior, calculating an anomaly score indicating how likely it is that reverse engineering is being performed on a vehicle, detecting a vehicle having an anomaly score that is greater than a statistical value (e.g., a mean value) of anomaly scores of vehicles of an identical vehicle type, and taking a countermeasure against an anomaly based on the value of the anomaly score and an anomaly category.

An anomalous vehicle detection server according to one embodiment of the present disclosure includes an anomaly score acquirer and an anomalous vehicle determiner. The anomaly score acquirer detects a suspicious behavior different from a predetermined driving behavior based on pieces of vehicle information received from a plurality of vehicles, respectively, and acquires an anomaly score of each of the plurality of vehicles. The anomaly score indicates the likelihood that reverse engineering is being performed on the vehicle, and the pieces of vehicle information are each based on a vehicle log including the content of an event that has occurred in a vehicle system. The anomalous vehicle determiner determines whether one vehicle of the plurality of vehicles is an anomalous vehicle based on the anomaly score of the one vehicle and a statistical value of the anomaly scores of two or more vehicles of the plurality of vehicles.

This configuration makes it possible to calculate how likely it is that an in-vehicle network system is being subjected to reverse engineering and to grasp a more suspicious vehicle. Therefore, the security of the in-vehicle network system can be increased effectively.

For example, the two or more vehicles may include a vehicle of a vehicle type identical to a vehicle type of the one vehicle. The anomalous vehicle determiner may compare the anomaly score of the one vehicle against the statistical value that is based on the anomaly score of the vehicle type identical to the vehicle type of the one vehicle and determine whether the one vehicle is the anomalous vehicle based on a comparison result.

This configuration makes it possible to exclude an anomaly that is highly likely to occur in a specific vehicle type and to extract a vehicle and an anomaly that rarely occurs in another vehicle of the same vehicle type and that is more suspicious. Therefore, the security of the in-vehicle network system can be increased more effectively.

For example, the two or more vehicles may include a vehicle located in a same area as an area where the one vehicle is located. The anomalous vehicle determiner may compare the anomaly score of the one vehicle against the statistical value that is based on the anomaly score of the vehicle located in the area identical to the area where the one vehicle is located and determine whether the one vehicle is the anomalous vehicle based on a comparison result.

This configuration makes it possible to exclude an anomaly that is highly likely to occur in a specific area and to extract a vehicle and an anomaly that rarely occurs in another vehicle located in the same area and that is more suspicious. Therefore, the security of the in-vehicle network system can be increased more effectively.

For example, when an anomalous vehicle type of a vehicle type identical to a vehicle type of the anomalous vehicle and an anomalous area is an area where the anomalous vehicle has been detected, the anomalous vehicle determiner may further determine that a degree of progress of an attack in the reverse engineering is a first attack stage when there are no more than a predetermined number of anomalous vehicles that are each the anomalous vehicle and are each of the anomalous vehicle type or when there are no more than the predetermined number of the anomalous vehicles in the anomalous area, and determine that the degree of the progress of the attack in the reverse engineering is a second attack stage more advanced than the first attack stage when there are more than the predetermined number of the anomalous vehicles of the anomalous vehicle type or when there are more than the predetermined number of the anomalous vehicles in the anomalous area.

This configuration makes it possible to determine that the attack is in the first attack stage (e.g., the reconnaissance phase) in which the attacker is in the middle of analyzing the anomalous vehicle if an anomaly is occurring only in a small number of vehicles, that is, only in no more than a predetermined number of vehicles and to determine that the attack is in the second attack stage (e.g., the delivery phase in which the attacker has succeeded in the network analysis and the system analysis of the vehicle and is attempting to extend the attack to another vehicle) if an anomaly is occurring in more than the predetermined number of vehicles. Being able to determine the attack stage makes it possible to switch the means of countermeasure taking and to change the priority of analysis.

For example, the anomaly score acquirer may calculate the anomaly score based on the content of the event included in the vehicle log; detect, as the suspicious behavior, any one of a frequent occurrence of a network device connection, an internet connection anomaly, a frequent occurrence of a diagnosis command, a change in an address being accessed, and a change in an address being accessed from, based on the content of the event; determine that the suspicious behavior is a network analysis activity in response to detecting the suspicious behavior; and increase the anomaly score of the one vehicle.

This configuration makes it possible to capture an attempt that the attacker makes to analyze the communication function of the vehicle system. Therefore, the security of the in-vehicle network system can be increased even more effectively.

For example, the anomaly vehicle detection server may further include an anomaly countermeasure notifier. In response to the anomaly score acquirer determining that the suspicious behavior is the network analysis activity, the anomaly countermeasure notifier may cause any one or more of shutting down a network interface, limiting the address being accessed and the address being accessed from, limiting a total number of connections of the network device, and alerting a driver to be implemented in accordance with a value of the anomaly score.

This configuration makes it possible to interfere with an attempt that the attacker makes to analyze the communication function of the vehicle system. Therefore, the security of the in-vehicle network system can be increased even more effectively.

For example, the anomaly score acquirer may calculate the anomaly score based on the content of the event included in the vehicle log; detect, as the suspicious behavior, any one of a frequent occurrence of a vehicle control function, a frequent occurrence of a system error, a deletion of a system error, a frequent occurrence of a malfunction code, a system login, and a change in a file count or in a process count, based on the content of the event; determine that the suspicious behavior is a system analysis activity in response to detecting the suspicious behavior; and increase the anomaly score of the one vehicle.

This configuration makes it possible to capture an attempt that the attacker makes to analyze the vehicle control function or the host machine itself of the vehicle system. Therefore, the security of the in-vehicle network system can be increased even more effectively.

For example, the anomalous vehicle detection server may further include an anomaly countermeasure notifier. In response to the anomaly score acquirer determining that the suspicious behavior is the system analysis activity, the anomaly score acquirer may cause any one or more of stopping the vehicle control function from starting, increasing a frequency at which the vehicle log is transmitted, increasing a total number of types of the vehicle log, and alerting a driver to be implemented in accordance with a value of the anomaly score.

This configuration makes it possible to interfere with an attempt that the attacker makes to analyze the vehicle control function or the host machine itself of the vehicle system. Therefore, the security of the in-vehicle network system can be increased even more effectively.

For example, even in a case where the anomaly score acquirer has detected the suspicious behavior, the anomaly score acquirer may refrain from increasing the anomaly score when the anomaly score acquirer detects the suspicious behavior again within a predetermined period that is based on a time at which the suspicious behavior has been detected or when the anomaly score acquirer detects the suspicious behavior in a predetermined area.

This configuration makes it possible to prevent a false detection resulting from detecting a suspicious behavior incorrectly when the suspicious behavior is being produced by a developer verifying the vehicle system, when a repair service provider is resolving an error, or when the file count changes due to the software update of the vehicle system. Therefore, the accuracy of detecting a suspicious behavior can be improved effectively.

For example, the anomaly score acquirer may lower the anomaly score when, in a vehicle in which the suspicious behavior has been detected, the suspicious behavior is not detected again within a predetermined period that is based on a time at which the suspicious behavior has been detected.

With this configuration, since it is unlikely that the attacker uses a vehicle to be attacked for normal traveling, if no suspicious behavior occurs in a given vehicle while the vehicle is traveling normally for a while, this vehicle can seem unlikely to be the vehicle to be attacked. Therefore, the accuracy of determining whether a given vehicle is a vehicle to be attacked can be improved effectively.

For example, the anomalous vehicle detection server may further include an anomaly countermeasure notifier that requests any one or more countermeasures selected from shutting down a network interface, limiting an address being accessed and an address being accessed from, limiting a total number of network devices to be connected, alerting a driver, limiting a network connection, limiting a vehicle control function, stopping the vehicle control function from starting, increasing a frequency at which the vehicle log is transmitted, increasing a total number of types of the vehicle log, and notifying the driver to be taken on a vehicle that the anomalous vehicle determiner has determined to be the anomalous vehicle, based on a value of the anomaly score or a type of the suspicious behavior.

This configuration makes it possible to interfere with an analysis performed by the attacker by limiting the vehicle control function of a vehicle that is highly likely to be being subjected to reverse engineering by the attacker and to analyze the content of the attack by increasing the number of types of the vehicle log. Therefore, the analysis performed by the attacker can be prevented efficiently, and the content of the attack perpetrated by the attacker can be captured efficiently.

For example, the anomalous vehicle detection server may further include an anomaly countermeasure notifier that, when the anomalous vehicle determiner has determined that the anomalous vehicle type is in the second attack stage, requests any one or more countermeasures selected from shutting down a network interface, limiting an address being accessed and an address being accessed from, limiting a total number of network devices to be connected, alerting a driver, limiting a network connection, limiting a vehicle control function, stopping the vehicle control function from starting, increasing a frequency at which the vehicle log is transmitted, increasing a total number of types of the vehicle log, and notifying the driver to be taken on a vehicle of a vehicle type identical to a vehicle type of the vehicle determined to be the anomalous vehicle, based on a value of the anomaly score or a type of the suspicious behavior.

This configuration makes it possible to interfere with an analysis performed by the attacker by limiting the vehicle control function of a vehicle type that is highly likely to be being subjected to reverse engineering by the attacker and to analyze the content of the attack by increasing the number of types of the vehicle log. Therefore, the analysis performed by the attacker can be prevented efficiently, and the content of the attack perpetrated by the attacker can be captured efficiently.

For example, the anomalous vehicle detection server may further include an anomaly countermeasure notifier that, when the anomalous vehicle determiner has determined that the anomalous vehicle is in the second attack stage in the anomalous area, requests any one or more countermeasures selected from shutting down a network interface, limiting an address being accessed and an address being accessed from, limiting a total number of network devices to be connected, alerting a driver, limiting a network connection, limiting a vehicle control function, stopping the vehicle control function from starting, increasing a frequency at which the vehicle log is transmitted, increasing a total number of types of the vehicle log, and notifying the driver to be taken on a vehicle, other than the anomalous vehicle, that is located in the anomalous area, based on a value of the anomaly score or a type of the suspicious behavior.

This configuration makes it possible to interfere with an analysis performed by the attacker by limiting the vehicle control function in an area where it is highly likely that reverse engineering is being performed by the attacker and to analyze the content of the attack by increasing the number of types of the vehicle log. Therefore, the analysis performed by the attacker can be prevented efficiently, and the content of the attack perpetrated by the attacker can be captured efficiently.

For example, the anomalous vehicle detection server may further include an anomaly display that displays, in a list form, anomalous vehicles in a descending order of the anomaly score, and the anomalous vehicles are each the anomalous vehicle.

This configuration allows an operator analyzing an anomalous vehicle by checking the content displayed on the anomaly display to analyze a more suspicious vehicle preferentially. Therefore, the operator can carry out the analysis work effectively.

For example, the anomalous vehicle detection server may further include an anomaly display that displays, on a map, position information of a vehicle determined to be the anomalous vehicle.

This configuration allows an operator analyzing an anomalous vehicle by checking the content displayed on the anomaly display to determine in which area the anomalous vehicle is located and in which facility an anomaly is occurring and to use such information as a hint in the analysis. Therefore, the operator can carry out the analysis work more effectively.

For example, the anomalous vehicle detection server may further include an anomaly display that displays at least one of a vehicle determined to be the anomalous vehicle, a vehicle type of the vehicle, position information of the vehicle, in response to the anomalous vehicle determiner determining that the anomalous vehicle type is in the first attack stage, and displays information indicating that the degree of the progress of the attack is more advanced than the first attack stage, in response to the anomalous vehicle determiner determining that the anomalous vehicle type is in the second attack stage.

This configuration allows an operator analyzing an anomalous vehicle by checking the content displayed on the anomaly display to capture the degree of progress of the attack on the anomalous vehicle and to prioritize the analysis. Therefore, the operator can carry out the analysis work more effectively.

An anomalous vehicle detection method according to one embodiment of the present disclosure includes an anomaly score acquiring step of detecting a suspicious behavior different from a predetermined driving behavior based on pieces of vehicle information received from a plurality of vehicles, respectively, and acquiring an anomaly score of each of the plurality of vehicles, the anomaly score indicating a likelihood that reverse engineering is performed on the vehicle, the pieces of vehicle information each being based on a vehicle log including content of an event that has occurred in a vehicle system provided in the vehicle; and an anomalous vehicle determining step of determining whether one vehicle of the plurality of vehicles is an anomalous vehicle based on the anomaly score of the one vehicle and a statistical value of the anomaly scores of two or more vehicles of the plurality of vehicles.

This method can provide advantageous effects similar to the advantageous effects provided by the anomalous vehicle detection server described above.

Hereinafter, an anomalous vehicle detection system according to an embodiment of the present disclosure will be described with reference to the drawings. It is to be noted that the embodiment described below merely illustrates a specific, preferable example of the present disclosure. In other words, the numerical values, the shapes, the materials, the constituent elements, the arrangements and the connection modes of the constituent elements, the steps, the order of the steps, and so on illustrated in the following embodiment are examples of the present disclosure and are not intended to limit the present disclosure. The present disclosure is specified based on the claims. Therefore, among the constituent elements in the following embodiment, any constituent element that is not described in the independent claims expressing the broadest concept of the present disclosure is not necessarily required in order to solve the problem faced by the present disclosure but is construed as a constituent element forming a more preferable embodiment.

Moreover, the drawings are schematic diagrams and do not necessarily provide the exact depictions. In the drawings, configurations that are substantially identical are given identical reference characters, and duplicate descriptions thereof may be omitted or simplified.

Embodiment

1 Overall Configuration Diagram of Anomalous Vehicle Detection System

FIG. 1 is a diagram illustrating an overall configuration of an anomalous vehicle detection system according to the present embodiment. As illustrated in FIG. 1, the anomalous vehicle detection system includes anomalous vehicle detection server 10, vehicle system 20, and exclusion rule share server 30. In the anomalous vehicle detection system, anomalous vehicle detection server 10, exclusion rule share server 30, and vehicle system 20 are communicably connected to each other via an external network. The external network is the internet, for example. The external network may employ wired communication or wireless communication. The wireless communication scheme may be Wi-Fi (registered trademark), which is an existing technology, or may be 3G/Long Term Evolution (LTE), but these are not limiting examples.

Vehicle system 20 is provided in a vehicle and includes vehicle log transmission device 200. Vehicle log transmission device 200 is a communication device that transmits a vehicle log to anomalous vehicle detection server 10 via the external network. The vehicle log will be described later in detail. It is to be noted that, although FIG. 1 illustrates only one vehicle system 20 included in the anomalous vehicle detection system, one or more vehicle systems 20 may each transmit a vehicle log to anomalous vehicle detection server 10. The anomalous vehicle detection system may include a plurality of vehicle systems 20, for example.

Exclusion rule share server 30 is a server that transmits, to anomalous vehicle detection server 10, an exclusion rule to be used by anomalous vehicle detection server 10. An exclusion rule is created by the developer of vehicle system 20, for example, and uploaded to exclusion rule share server 30. An exclusion rule includes a list of software updates for vehicle system 20 or a list of dealerships, development bases, verification bases, repair service providers, or the like. An exclusion rule has written therein at least one or more of an anomaly rule to be excluded when anomalous vehicle detection server 10 calculates the anomaly score by referring to anomaly rules and the content of an event in a vehicle log, the duration of the anomaly rule to be excluded, or the position information. An exclusion rule will be described later in detail.

Anomalous vehicle detection server 10 receives a vehicle log from vehicle log transmission device 200 and receives an exclusion rule from exclusion rule share server 30. Then, anomalous vehicle detection server 10 is a server that calculates the anomaly score for each vehicle based on the vehicle log, the exclusion rule, and the anomaly rule having written therein a condition for determining a vehicle log stored in advance to be anomalous and that detects an anomalous vehicle. The method of calculating the anomaly score and the method of determining an anomalous vehicle will be described later in detail.

It is to be noted that, although the anomaly score is calculated by anomalous vehicle detection server 10 in the example described below, the anomaly score may instead be calculated by vehicle system 20. Anomalous vehicle detection server 10 may acquire the anomaly score of given vehicle system 20 from this vehicle system 20 via the external network. The vehicle log or the anomaly score that anomalous vehicle detection server 10 acquires from vehicle system 20 via the external network is an example of vehicle information that is based on the vehicle log.

2 Configuration Diagram of Vehicle System

Figure 2:
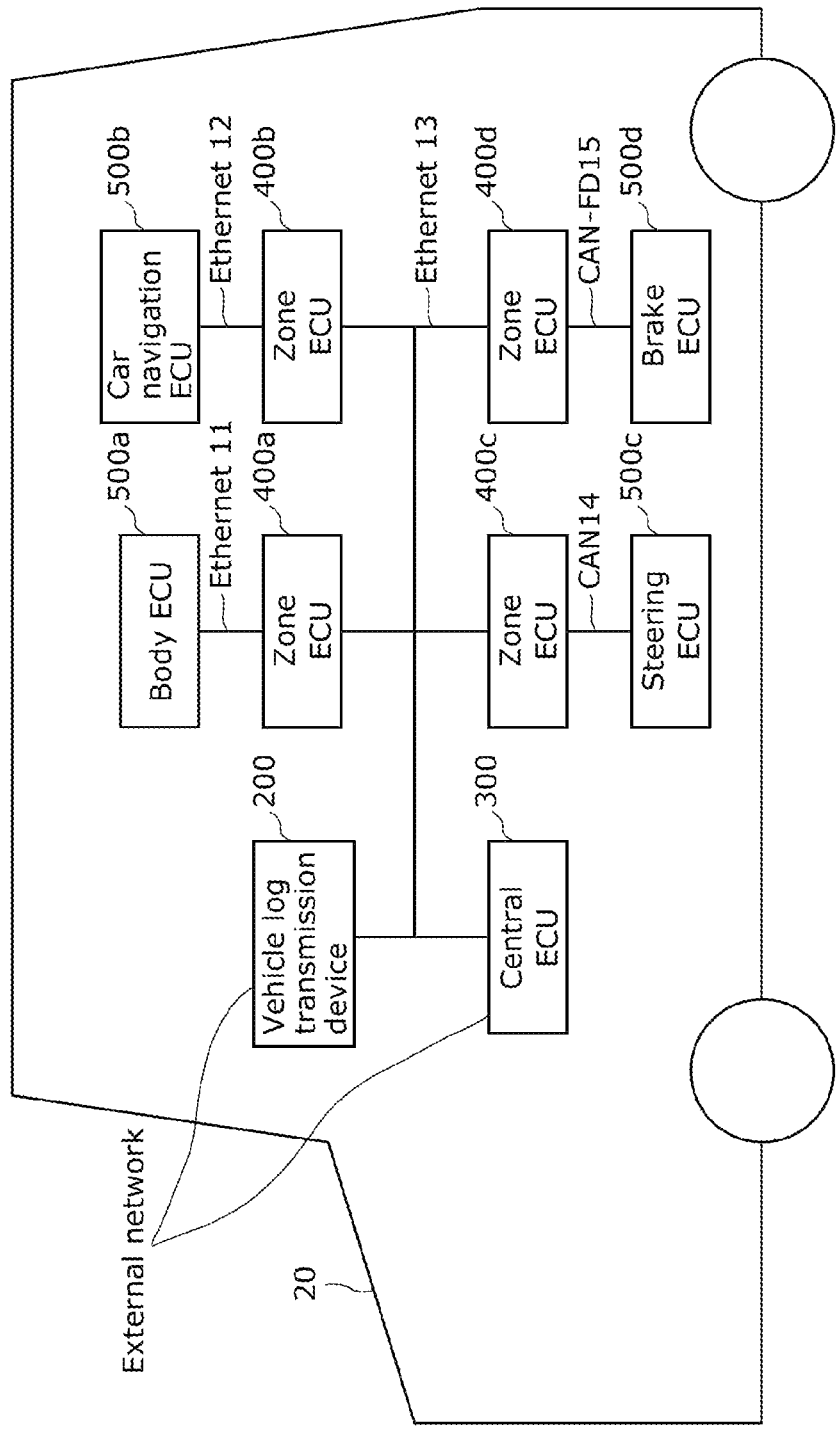
FIG. 2 is a configuration diagram of a vehicle system according to the embodiment.

FIG. 2 is a configuration diagram of vehicle system 20 according to the present embodiment. Vehicle system 20 includes vehicle log transmission device 200, central ECU 300, Zone ECU 400a, Zone ECU 400b, Zone ECU 400c, Zone ECU 400d, body ECU 500a, car navigation ECU 500b, steering ECU 500c, and brake ECU 500d. Vehicle log transmission device 200, central ECU 300, Zone ECU 400a, Zone ECU 400b, Zone ECU 400c, and Zone ECU 400d are connected to each other via Ethernet 13. Ethernet 13 is an in-vehicle network. Body ECU 500a and Zone ECU 400a are connected to each other via Ethernet 11. Car navigation ECU 500b and Zone ECU 400b are connected to each other via Ethernet 12. Steering ECU 500c and Zone ECU 400c are connected to each other via CAN 14. Brake ECU 500d and Zone ECU 400d are connected to each other via CAN with Flexible Data Rate (CAN-FD) 15. Vehicle log transmission device 200 and central ECU 300 are connected to the external network as well.

Vehicle log transmission device 200 is a device that collects a vehicle log from central ECU 300 via Ethernet 13 and transmits the collected vehicle log to anomalous vehicle detection server 10 via the external network.

Central ECU 300 controls Zone ECU 400a, Zone ECU 400b, Zone ECU 400c, and Zone ECU 400d via Ethernet 13 and controls vehicle system 20 as a whole. For example, central ECU 300 controls vehicle controlling functions for automatic parking, automatic driving, and so on. Moreover, central ECU 300 collects, from Zone ECUs 400a to 400d, event information on a connection of a network device that has occurred in vehicle system 20 or an internet connection anomaly, stores the collected event information in the form of a vehicle log, and transmits the vehicle log to vehicle log transmission device 200.

Zone ECU 400a, Zone ECU 400b, Zone ECU 400c, and Zone ECU 400d communicate with central ECU 300 and the other Zone ECUs via Ethernet 13. For example, Zone ECU 400a communicates with body ECU 500a via Ethernet 11 and controls functions related to the vehicle body, such as a lock or a wiper of the vehicle. Zone ECU 400b communicates with car navigation ECU 500b via Ethernet 12 and controls the display on the car navigation system. For example, Zone ECU 400c communicates with steering ECU 500c via CAN 14 and controls steering of the steering wheel. Zone ECU 400d communicates with brake ECU 500d via CAN-FD 15 and controls the brake.

Body ECU 500a controls functions related to the vehicle body provided in the vehicle.

Car navigation ECU 500b controls the display on the car navigation system provided in the vehicle.

Steering ECU 500c controls steering of the steering wheel provided in the vehicle.

Brake ECU 500d controls the brake provided in the vehicle.

3 Configuration Diagram of Anomalous Vehicle Detection Server 10

Figure 3:
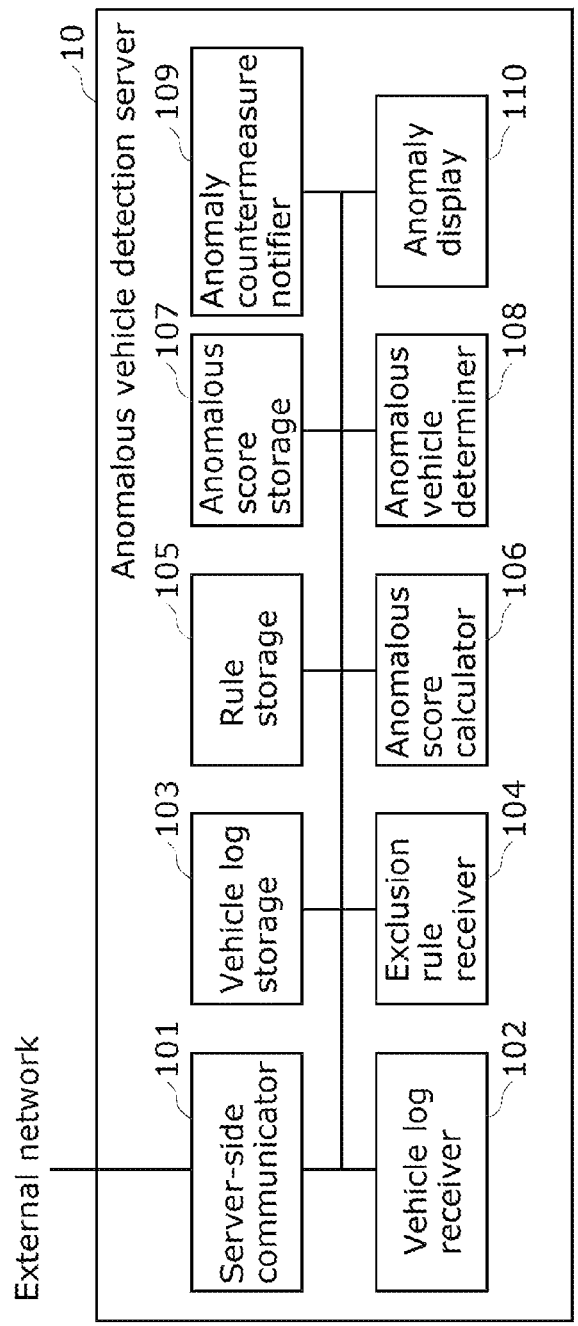
FIG. 3 is a configuration diagram of an anomalous vehicle detection server according to the embodiment.

FIG. 3 is a configuration diagram of anomalous vehicle detection server 10 according to the present embodiment. Anomalous vehicle detection server 10 includes server-side communicator 101, vehicle log receiver 102, vehicle log storage 103, exclusion rule receiver 104, rule storage 105, anomaly score calculator 106, anomaly score storage 107, anomalous vehicle determiner 108, anomaly countermeasure notifier 109, and anomaly display 110.

Server-side communicator 101 receives a vehicle log from vehicle log transmission device 200 via the external network and transmits the received vehicle log to vehicle log receiver 102. Moreover, server-side communicator 101 receives an exclusion rule from exclusion rule share server 30 and transmits the received exclusion rule to exclusion rule receiver 104.

Vehicle log receiver 102 receives a vehicle log from server-side communicator 101 and stores the received vehicle log into vehicle log storage 103.

Exclusion rule receiver 104 receives an exclusion rule from server-side communicator 101 and stores the received exclusion rule into rule storage 105.

Rule storage 105 stores in advance a countermeasure rule, and the countermeasure rule has written therein an anomaly rule having written therein a condition for determining a given event included in a vehicle log to be an anomaly, an anomaly category written in an anomaly rule, and the content of a countermeasure corresponding to an anomaly score. Moreover, rule storage 105 stores an exclusion rule that exclusion rule receiver 104 has received from exclusion rule share server 30.

In response to receiving a vehicle log, anomaly score calculator 106 acquires an anomaly rule and an exclusion rule from rule storage 105 and acquires an anomaly score for each vehicle by calculating the anomaly score for each vehicle based on the content of the event written in the vehicle log, the anomaly rule, and the exclusion rule. For example, anomaly score calculator 106 detects a suspicious behavior different from a predetermined driving behavior based on the content of the event in a plurality of pieces of vehicle information that have been received from the respective vehicles and that each are based on the vehicle log that includes data on the content of the event that has occurred in vehicle system 20. Then, anomaly score calculator 106 calculates the anomaly score for acquiring the anomaly score indicating the likelihood that the reverse engineering is being performed on a given vehicle for each of the plurality of vehicles. For example, anomaly score calculator 106 calculates the anomaly score based on the content of the event included in the vehicle log. Then, anomaly score calculator 106 records the acquired (e.g., calculated) anomaly score into anomaly score storage 107. The method of calculating the anomaly score will be described later in detail. Anomaly score calculator 106 is an example of an anomaly score acquirer.

An anomaly score is an index that indicates, for example, the likelihood that reverse engineering is being performed (e.g., how likely it is that an attacker is performing reverse engineering). Moreover, an anomaly score is an index that makes it possible to determine the likelihood that reverse engineering is being performed, for example. Furthermore, an anomaly score can be rephrased as an index indicating that the vehicle is used in a way that a normal driver would not use the vehicle or would be less likely to use the vehicle, for example. It is to be noted that the reverse engineering as used in the present specification means analyzing an in-vehicle network. Therefore, an anomaly score can be rephased as an index that indicates the likelihood that the in-vehicle network of the vehicle is being analyzed or the degree of such an analysis, for example.

Anomalous vehicle determiner 108 refers to an anomaly score stored in anomaly score storage 107 and detects an anomalous vehicle that is suspected of being under an attack attempt. For example, anomalous vehicle determiner 108 detects an anomalous vehicle by determining whether a given vehicle is an anomalous vehicle based on the anomaly score of the given vehicle among a plurality of vehicles and the statistical value of the anomaly scores of two or more vehicles among the plurality of vehicles. Moreover, anomalous vehicle determiner 108 determines an attack stage based on the information of the anomalous vehicle (e.g., the vehicle information). The method of detecting an anomalous vehicle and the method of determining an attack stage will be described later in detail. Herein, the two or more vehicles may include a vehicle of a vehicle type identical to the vehicle type of the given vehicle determined to be an anomalous vehicle or may include a vehicle located in the same area as the given vehicle. Moreover, the two or more vehicles may include a vehicle provided with an ECU identical to an ECU provided in the given vehicle, may include a vehicle from the same supplier (the same manufacturer) as the given vehicle, or may include a vehicle that performs wireless communication by use of the same base station as the given vehicle. It is to be noted that the two or more vehicles may or may not include the given vehicle.

Anomaly countermeasure notifier 109 transmits an anomaly countermeasure notification to the vehicle that anomalous vehicle determiner 108 has determined to be an anomalous vehicle and at least one of a vehicle of the same vehicle type as the anomalous vehicle or a vehicle located in the same area as the anomalous vehicle. An anomaly countermeasure notification is a notification that includes one or more countermeasures selected from shutting down a network interface, limiting an address being accessed and an address being accessed from, limiting the number of network devices to be connected, alerting the driver, limiting the network connection, limiting the vehicle control function, keeping the vehicle control function from starting, increasing the frequency at which the vehicle log is transmitted, increasing the number of types of the vehicle log, and notifying the driver. In a case where a suspicious behavior is determined to be a network analysis activity or a system analysis activity, anomaly countermeasure notifier 109 sends a notification to vehicle log transmission device 200 or central ECU 300 of vehicle system 20 to cause vehicle system 20 to execute one or more countermeasures of the countermeasures listed above.

Anomaly display 110 displays, to the user, information related to the vehicle that anomalous vehicle determiner 108 has determined to be an anomalous vehicle and at least one of a vehicle of the same vehicle type as the stated vehicle (i.e., the anomalous vehicle) or a vehicle located in the same area as the stated vehicle (i.e., the anomalous vehicle). For example, an operator who conducts an analysis by use of anomalous vehicle detection server 10 is the user, and anomaly display 110 displays the aforementioned information by use of a graphical user interface. This information includes information that allows the user to identify an anomalous vehicle that should be monitored intensely.

4 Configuration Diagram of Vehicle Log Transmission Device

Figure 4:
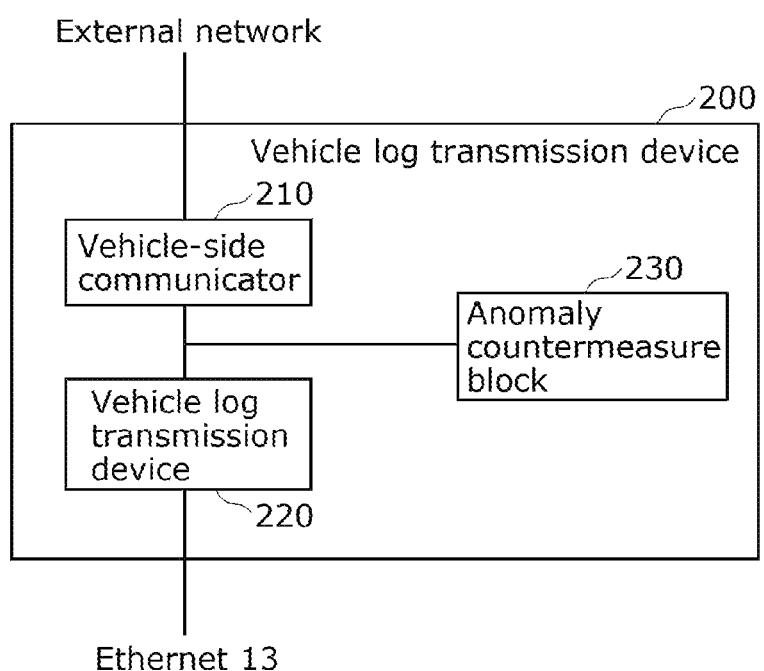
FIG. 4 is a configuration diagram of a vehicle log transmission device according to the embodiment.

FIG. 4 is a configuration diagram of vehicle log transmission device 200 according to the present embodiment. Vehicle log transmission device 200 includes vehicle-side communicator 210, vehicle log transmitter 220, and anomaly countermeasure block 230.

Vehicle-side communicator 210 is connected to anomalous vehicle detection server 10 via the external network and exchanges various pieces of information with anomalous vehicle detection server 10.

Vehicle log transmitter 220 is connected to central ECU 300 via Ethernet 13. Vehicle log transmitter 220 receives a vehicle log from central ECU 300 and transmits the received vehicle log to anomalous vehicle detection server 10 via vehicle-side communicator 210.

In a case where anomalous vehicle detection server 10 has detected an anomalous vehicle, anomaly countermeasure block 230 receives an anomaly countermeasure notification transmitted by anomalous vehicle detection server 10 and instructs central ECU 300 or vehicle log transmitter 220 to take a countermeasure in accordance with the content of the received anomaly countermeasure notification. For example, in a case where the content of the anomaly countermeasure notification indicates the limiting of the vehicle control function, anomaly countermeasure block 230 instructs central ECU 300 to limit the function. Meanwhile, in a case where the content of the anomaly countermeasure notification indicates an increase in the frequency at which the vehicle log is transmitted, anomaly countermeasure block 230 instructs vehicle log transmitter 220 to increase the frequency at which the vehicle log is transmitted.

5 Example of Vehicle Log

FIG. 5 illustrates an example of a vehicle log stored in vehicle log storage 103 according to the present embodiment. A vehicle log includes the content of each event that has occurred in vehicle system 20 and is used when anomaly score calculator 106 calculates an anomaly score. A vehicle log includes, for each event, the vehicle log number, the vehicle identifier, the vehicle type, the time, the vehicle position information, and the event name. In FIG. 5, in the row in which the vehicle log number is 1, the vehicle identifier that corresponds one-to-one with the vehicle is "A1", the vehicle type that indicates the type of the vehicle is "A", the time that indicates the time at which the event has occurred is "TA11", the vehicle position information that indicates the position of the vehicle held when the event has occurred is "X1,Y1", and the event name is "network device registration". For example, the vehicle position information is the position information of the vehicle held at the time when the event has occurred, and the vehicle position information is acquired by use of GPS information. For example, the network device registration is an event in which a smartphone has become connected to car navigation ECU 500b via Bluetooth (registered trademark), and the network device deletion is an event in which a smartphone connected to car navigation ECU 500b via Bluetooth (registered trademark) gets deleted. Alternatively, for example, the network device registration is an event in which a tablet device has become connected to car navigation ECU 500b via Wi-Fi, and the network device deletion is an event in which a tablet device connected to car navigation ECU 500b via Wi-Fi gets deleted.

The vehicle control function operation is an event in which a function for controlling vehicle system 20 is put into operation, and examples include an event in which the emergency brake is operated or an event in which the automatic parking mode is started.

The system error occurrence is an event in which central ECU 300 experiences an error in Zone ECUs 400a to 400d or central ECU 300 experiences a network error in Ethernet 13, Ethernet 11, Ethernet 12, CAN 14, or CAN-FD 15. The system error resolution is an event in which a system error is resolved by use of a vehicle diagnostic tool used at a dealership or the like.

The access to address A is an event in which car navigation ECU 500b has accessed a web server at address A.

The access from address B is an event in which car navigation ECU 500b has been accessed from a server at address B.

The system login is an event in which a login attempt has been made to car navigation ECU 500b.

The increase in the file count is an event in which the types of files to be stored in central ECU 300 have increased.

In other words, in the example shown FIG. 5, by referring to the rows that have the same vehicle identifier but different event names, namely the network device registration and the network device deletion, one can find that one network device has become connected in the period and the number of the connected network devices has decreased by one thereafter during a period between time TA11 to time TA12.

Moreover, by referring to the rows that have the same vehicle identifier but of which one has the internet disconnection as the event name and the other has the internet connection as the event name that has occurred at an immediately preceding time, one can obtain the time at which the internet has become disconnected based on the time difference. This description applies in a similar manner to the Virtual Private Network (VPN) disconnection and the VPN connection.

Moreover, by referring to the vehicle log in the row in which the vehicle log number is 7 and the vehicle log in the row in which the vehicle log number is 8, one can find that the emergency brake has been operated at time TA23 in an area defined by "X1,Y1" and also operated at time TA24 in an area defined by "X1,Y4". In the following, the vehicle position information may also be referred to as an area. An area may be a region (a static region) set in advance on a map or may be a region (a dynamic region) set in accordance with the position of an anomalous vehicle.

Moreover, referring to the event in which the event name is the access to address A and the event in which the event name is the access to address B allows one to find that car navigation ECU 500b has accessed these two addresses, and therefore one can acquire the change in the address being accessed.

Moreover, by referring to a plurality of events in which the event name is the increase in the file count or the increase in the process count, one can acquire the change in the file count or the change in the process count. The event name is an example of the content of an event.

Moreover, by referring to the time information included in the vehicle log, one can determine whether there is a match to an anomaly rule stating that the anomaly scores are to be added if a given event has occurred a predetermined number of times within a predetermined period.

6 Example of Anomaly Rule

FIG. 6 illustrates an example of an anomaly rule stored in rule storage 105 according to the present embodiment. An anomaly rule includes the anomaly rule number, the content of the anomaly rule, the period, the number of occurrences, the anomaly score, and the anomaly category. An occurrence of a suspicious behavior indicated by the content of the anomaly rule can be identified based on the vehicle log (e.g., the event name and so on).

The row in which the anomaly rule number is "1" shows that the content of the anomaly rule is "network device connection", the period is "one hour", the number of occurrences is "4", the anomaly score is "+1", and the anomaly category is "network analysis". In FIG. 6, for example, there is written a rule stating that the number of network connections within one hour is acquired from the vehicle log and the anomaly score is set to "+1" if the number of occurrences is 4 or more. In this example, the period "–" indicates that the period is not to be taken into consideration. For example, in the row in which the anomaly rule number is 8, there is written a rule stating that the number of occurrences of the system login is acquired from the vehicle log and the anomaly score is set to "+5" if the number of occurrences is 1 or more.

The network device connection increases when an attacker attempts an intrusion by connecting a terminal, such as a smartphone, to vehicle system 20. Therefore, an occurrence of four connections made in one hour is determined to be an anomaly.

The internet or VPN shutdown occurs when an attacker intercepts the communication between vehicle system 20 and the server connected to vehicle system 20 or when an attacker intentionally disconnects the connection for fear of being detected. Therefore, an occurrence of one instance in 10 minutes is determined to be an anomaly.

The change in the address being accessed occurs when an attacker attempts to cause vehicle system 20 to access a malicious URL. Therefore, one occurrence is determined to be an anomaly, for example.

The change in the address being accessed from occurs when an attacker attempts an attack, such as a port scan, to vehicle system 20. Therefore, one occurrence is determined to be an anomaly.

The vehicle control function operation occurs when an attacker activates the emergency brake a plurality of times while investigating the activation command of the emergency brake. Therefore, ten occurrences in one hour is determined to be an anomaly.

The system error occurrence arises when communication that can result in an error is caused when an attacker has performed a brute force attack on vehicle system 20. Therefore, two occurrences in 24 hours is determined to be an anomaly.

The system error resolution occurs when an attacker himself or herself deletes a system error by use of a vehicle diagnostic tool or the like upon causing the system error to occur. Therefore, one occurrence is determined to be an anomaly.

The system login occurs when an attacker attempts a user login to vehicle system 20. Therefore, one occurrence is determined to be an anomaly.

The change in the file count or the change in the process count occurs as the file count or the process count increases when an attacker installs malware into vehicle system 20. Therefore, one occurrence is determined to be an anomaly.

The anomaly category has written therein either the network analysis or the system analysis. The network analysis indicates that it is highly likely that an attacker is analyzing the communication function of vehicle system 20. The network analysis indicates that it is highly likely that an attacker is analyzing a host machine of vehicle system 20. The anomaly category is used to select an effective anomaly countermeasure means when taking a countermeasure against an anomaly.

For example, anomaly score calculator 106 may detect, as a suspicious behavior, any one of a frequent occurrence of the network device connection, an internet connection anomaly, a frequent occurrence of a diagnosis command, a change in the address being accessed, and a change in the address being accessed from. Then, if the suspicious behavior has occurred, anomaly score calculator 106 may determine that this suspicious behavior is a network analysis activity and may increase the anomaly score of this vehicle. Moreover, for example, anomaly score calculator 106 may detect, as a suspicious behavior, any one of a frequent occurrence of the vehicle control function, a frequent occurrence of a system error, a deletion of a system error, a frequent occurrence of a malfunction code, a system login, and a change in the file count or in the process count. Then, if the suspicious behavior has occurred, anomaly score calculator 106 may determine that this suspicious behavior is a system analysis activity and may increase the anomaly score of this vehicle.

It is to be noted that the anomaly rule shown in FIG. 6 is an example, and this is not a limiting example. Moreover, the periods, the numbers of occurrences, the numerical values shown in FIG. 6 are examples, and these are not limiting examples.

7 Example of Exclusion Rule

FIG. 7 illustrates an example of an exclusion rule stored in rule storage 105 according to the present embodiment. In FIG. 7, the exclusion rule number, the position information, the effective period, the content, and the to-be-excluded anomaly rule are written for each exclusion rule.

In the row in which the exclusion rule number is "3" in FIG. 7, the position information is "X6,Y6", the effective period is not set and indicated by "–", the content is "repair service provider A", and the to-be-excluded anomaly rule is "system error resolution". In other words, repair service provider A is present at X6,Y6 indicated by the position information, and it is likely that repair service provider A resolves the system error by use of a dedicated tool. Therefore, the aforementioned row indicates that the event of a system error resolution is not to be determined as an anomaly in the anomaly rule and the anomaly score is not to be counted.

In addition, in the row in which the exclusion rule number is 4 in FIG. 7, the position information is "Japan", the effective period is "T3 to T4", the content is "software update A", the to-be-excluded anomaly rule is "the change in the file count or in the process count". In other words, a software update is performed for vehicle system 20 in the effective period of T3 to T4, and the file count may increase due to the software update. Therefore, the aforementioned row indicates that the change in the file count or in the process count is not to be determined as an anomaly and the anomaly score is not to be counted.

In addition, the row in which the exclusion rule number is M in FIG. 7 indicates that there is a tunnel in the area indicated by the position information of X4,Y4, and there is a possibility that an internet or VPN disconnection that is caused not by an attacker may occur. Therefore, the aforementioned row indicates that an occurrence of an internet or VPN disconnection is not to be determined as an anomaly and the anomaly score is not to be counted.

8 Example of Anomaly Score

FIG. 8 illustrates an example of an anomaly score stored in anomaly score storage 107 according to the present embodiment. An anomaly score is calculated by anomaly score calculator 106 based on the vehicle log, the anomaly rule, and the exclusion rule. An anomaly score includes an anomaly score by vehicle, which is an anomaly score of each vehicle, a mean anomaly score by vehicle type, which is a mean of the anomaly scores of a given vehicle type, and a mean anomaly score by area, which is a mean of the anomaly scores of a given area. In this example, it suffices that the anomaly score be calculated by use of at least a vehicle log and an anomaly rule.

For the anomaly score by vehicle, an anomaly score is calculated for each anomaly rule number. The method of calculating the anomaly score will be described later. For example, the row in which the anomaly rule number is 2 indicates that the anomaly score of the vehicle whose vehicle identifier is A1 is 1. In addition, in the anomaly score by vehicle, the last anomaly date and time is stored for each vehicle. The last anomaly date and time indicates the time at which the last event determined to be an anomaly has occurred. Checking the last anomaly date and time allows one to acquire the period in which no anomaly has occurred in a specific vehicle. Therefore, the anomaly score can be lowered for a vehicle that an attacker is not attacking, that is, a vehicle in which no anomaly has occurred for a predefined period.

In the mean anomaly score by vehicle type, an anomaly score is calculated for each anomaly rule number and for each vehicle type, and the mean anomaly score by vehicle type includes a mean value for each vehicle type. For example, the row in which the anomaly rule number is 1 indicates that the mean anomaly score of vehicle type A is 0.

In the mean anomaly score by area, an anomaly score is calculated for each anomaly rule number and for each vehicle type, and the mean anomaly score by area includes a mean value for each area. For example, the row in which the anomaly rule number is 6 indicates that the mean anomaly score in the area defined by the position information of X2,Y2 is 0.5.

9 Example of Countermeasure Rule

FIG. 9 illustrates an example of a countermeasure rule stored in rule storage 105 according to the present embodiment. A countermeasure rule includes the countermeasure rule number, the anomaly category, the anomaly score, and the content of the countermeasure rule. Anomaly countermeasure notifier 109 acquires the anomaly category of the anomaly rule having the highest anomaly score and the value of the anomaly score of the stated anomaly category by referring to the anomaly score of the vehicle determined to be anomalous, selects a countermeasure rule in accordance with the anomaly category and the value of the anomaly score, and notifies anomaly countermeasure block 230 of the content of the countermeasure rule.

For example, anomaly countermeasure notifier 109 selects, as the content of the countermeasure rule, "limiting the address being accessed and the address being accessed from" in a case where the anomaly category is the network analysis and the anomaly score is 25.

The likelihood that an attacker is attempting an attack can be grasped based on the value of the anomaly score. Selecting a countermeasure based on the countermeasure rule shown in FIG. 9 makes it possible to take a countermeasure for more actively interfering with the attack attempt being made by the attacker as the anomaly score is greater or makes it possible to know that the likelihood of an attack attempt being made by an attacker is lower as the anomaly score is smaller and to take a countermeasure within a scope in which the normal use of vehicle system 20 is not affected.

"Shutting down the network interface" corresponds to a countermeasure of disabling the interface to the external network and shutting down an internet connection completely.

"Limiting the address being accessed and the address being accessed from" corresponds to a countermeasure of interfering with the network analysis attempted by an attacker by limiting one or more addresses being accessed over the internet and limiting one or more addresses being accessed from and one or more ports.

"Limiting the number of connected network devices" corresponds to a countermeasure of interfering with the network analysis, such as a brute force attack against a Wi-Fi password, by limiting the number of connected network devices to a small number.

"Stopping the vehicle control function" corresponds to a countermeasure of interfering with the system analysis performed by an attacker by keeping the automatic parking mode or the emergency brake itself from being activated, for example.

"Increasing the frequency at which the vehicle log is transmitted" corresponds to a countermeasure of grasping with more details the status of the system analysis performed by an attacker by changing the frequency to one transmission per 10 minutes even though a vehicle log is to be transmitted once per one hour in a normal operation state, that is, by increasing the frequency at which the vehicle log is transmitted.

"Increasing the number of types of the vehicle log" corresponds to a countermeasure taken for grasping with more details the status of the system analysis performed by an attacker by changing the number of the types of the vehicle log to five even though the number of types of the vehicle log is two in a normal operation state, that is, by increasing the number of types of the vehicle log.

"Alerting the driver" corresponds to a countermeasure of interfering with any subsequent analysis by notifying the driver, if the driver is an attacker, that the vehicle system is being monitored.

As illustrated in FIG. 9, for example, if a suspicious behavior is determined to be a network analysis activity, anomaly countermeasure notifier 109 causes any one or more of shutting down the network interface, limiting the address being accessed and the address being accessed from, limiting the number of connected network devices, and alerting the driver to be executed in accordance with the value of the anomaly score. Meanwhile, for example, if a suspicious behavior is determined to be a system analysis activity, anomaly countermeasure notifier 109 causes any one or more of keeping the vehicle control function from starting, increasing the frequency at which the vehicle log is transmitted, increasing the number of types of the vehicle log, and alerting the driver to be executed in accordance with the value of the anomaly score.

10 Example of Anomaly Score List Display Screen

FIG. 10 illustrates an example of an anomaly score list display screen displayed by anomaly display 110 according to the present embodiment. In the anomaly score list display screen, anomaly display 110 displays the anomaly scores and the vehicle identifiers in the descending order of the anomaly scores, for example. For example, anomaly display 110 may display the anomalous vehicles in a list form in the descending order of the anomaly scores. With this configuration, the operator who uses anomalous vehicle detection server 10 can find a more likely vehicle suspected of being attacked with ease and can analyze the vehicle log preferentially. It is to be noted that displaying the vehicle identifiers in the descending order of the anomaly scores in the anomaly score list display screen is not a limiting example.

11 Example of Anomaly Score Map Display Screen

Figure 11:
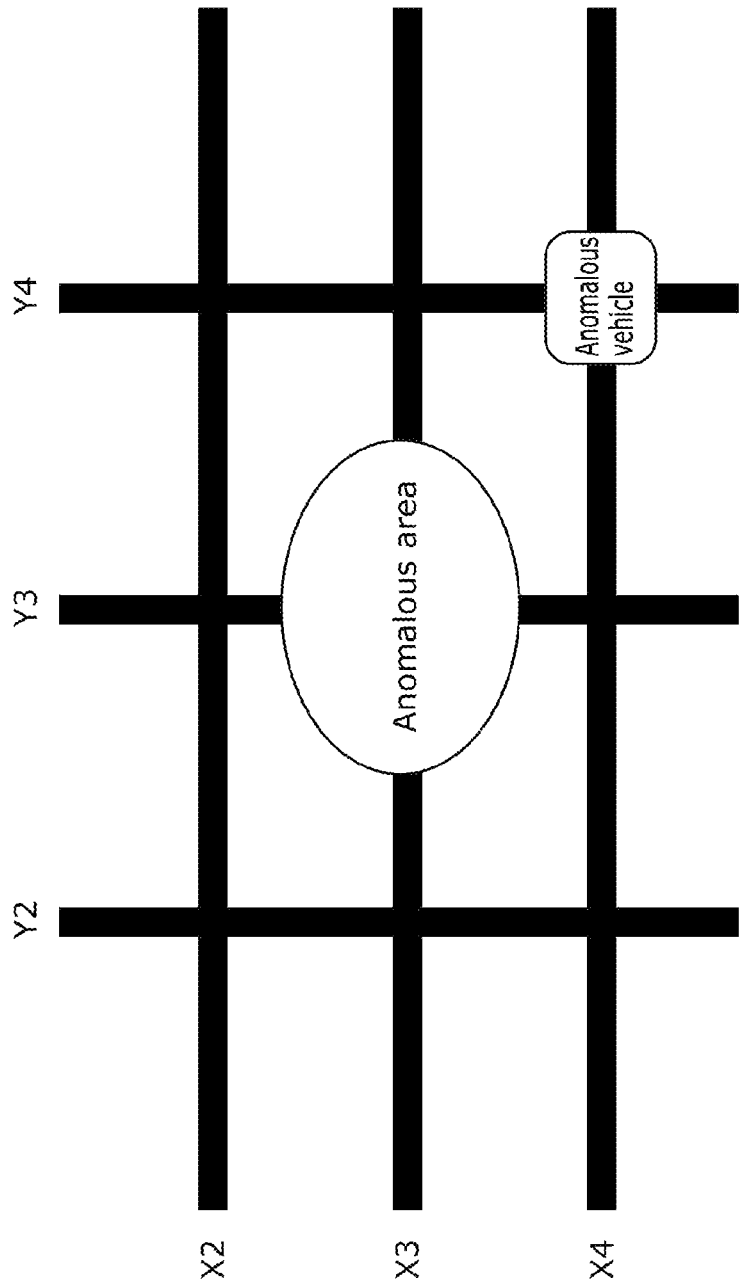
FIG. 11 is a diagram illustrating an example of an anomalous area display screen according to the embodiment.

FIG. 11 illustrates an example of an anomaly score map display screen displayed by anomaly display 110 according to the present embodiment. A map is displayed on this screen, and latitudes X2, X3, and X4 and longitudes Y2, Y3, and Y4 are displayed on the map. Moreover, displayed on the screen is the mark indicating that an anomalous vehicle is present at X4,Y4 indicated by the position information indicating the latest position of the vehicle determined to be the anomalous vehicle. Furthermore, the area in which the vehicle determined to be the anomalous vehicle, that is, X3,Y4, for example, is displayed on the map as an anomalous area. For example, an anomalous area may be a static area or a dynamic area that includes the point where the vehicle has been determined to be the anomalous vehicle. For example, FIG. 11 indicates that the vehicle has been determined to be anomalous at the position indicated by position information X3,Y3 and that the anomalous vehicle determined to be anomalous has moved to the position indicated by position information X4,Y4. The anomalous area and the latest position of the anomalous vehicle may be different from each other on the map. In this manner, anomaly display 110 may display the position information of the vehicle determined to be the anomalous vehicle on a map, for example.

Thus, the operator can intuitively and easily grasp the position where the vehicle that is highly likely to be under an attack attempt by an attacker is located and estimate the status of the attack perpetrated by the attacker based on the name of a facility or the like on the map.

12 Example of Anomaly Score Stage Display Screen

FIG. 12 illustrates an example of an anomaly score stage display screen displayed by anomaly display 110 according to the present embodiment. Phases that indicate the progress of an attack are displayed on the screen in accordance with the stages, and the phases include reconnaissance, weaponization, delivery, exploitation, installation, command and control (C&C), and action on objective. If the vehicle with vehicle identifier A1 that has been determined to be an anomalous vehicle is determined to be currently in the reconnaissance phase, a check mark is displayed in the column under the reconnaissance. Meanwhile, if the vehicle with vehicle identifier A1 that has been determined to be an anomalous vehicle is determined to be currently in the delivery phase, a check is displayed in the column under the delivery. FIG. 12 illustrates an example in which the vehicle with vehicle identifier A1 has been determined to be currently in the reconnaissance phase and the delivery phase. The method of determining whether a vehicle is in the reconnaissance phase and the method of determining whether a vehicle is in the delivery phase will be described later in detail.

For example, if anomalous vehicle determiner 108 has determined that an anomalous vehicle type is in the reconnaissance phase (an example of a first attack stage), anomaly display 110 may display at least one of the vehicle determined to be the anomalous vehicle, the vehicle type of this vehicle, or the position information of this vehicle. Meanwhile, if anomalous vehicle determiner 108 has determined that the anomalous vehicle is in the delivery phase (an example of a second attack stage), which is a more advanced attack stage than the reconnaissance phase, anomaly display 110 may display information indicating that the current stage is the delivery phase. In this example, the position information is the information that indicates the current position of the anomalous vehicle. Alternatively, the position information may be the information that indicates the position where the vehicle has been determined to be the anomalous vehicle.

The above configuration allows the operator to intuitively grasp how advanced the attack on vehicle A1 is.

It is to be noted that, although the progress of an attack is indicated by the progress that is based on the cyber kill chain, the progress of an attack is not limited to the progress based on the cyber kill chain.

13 Sequence of Vehicle Log Receiving Process

Figure 13:
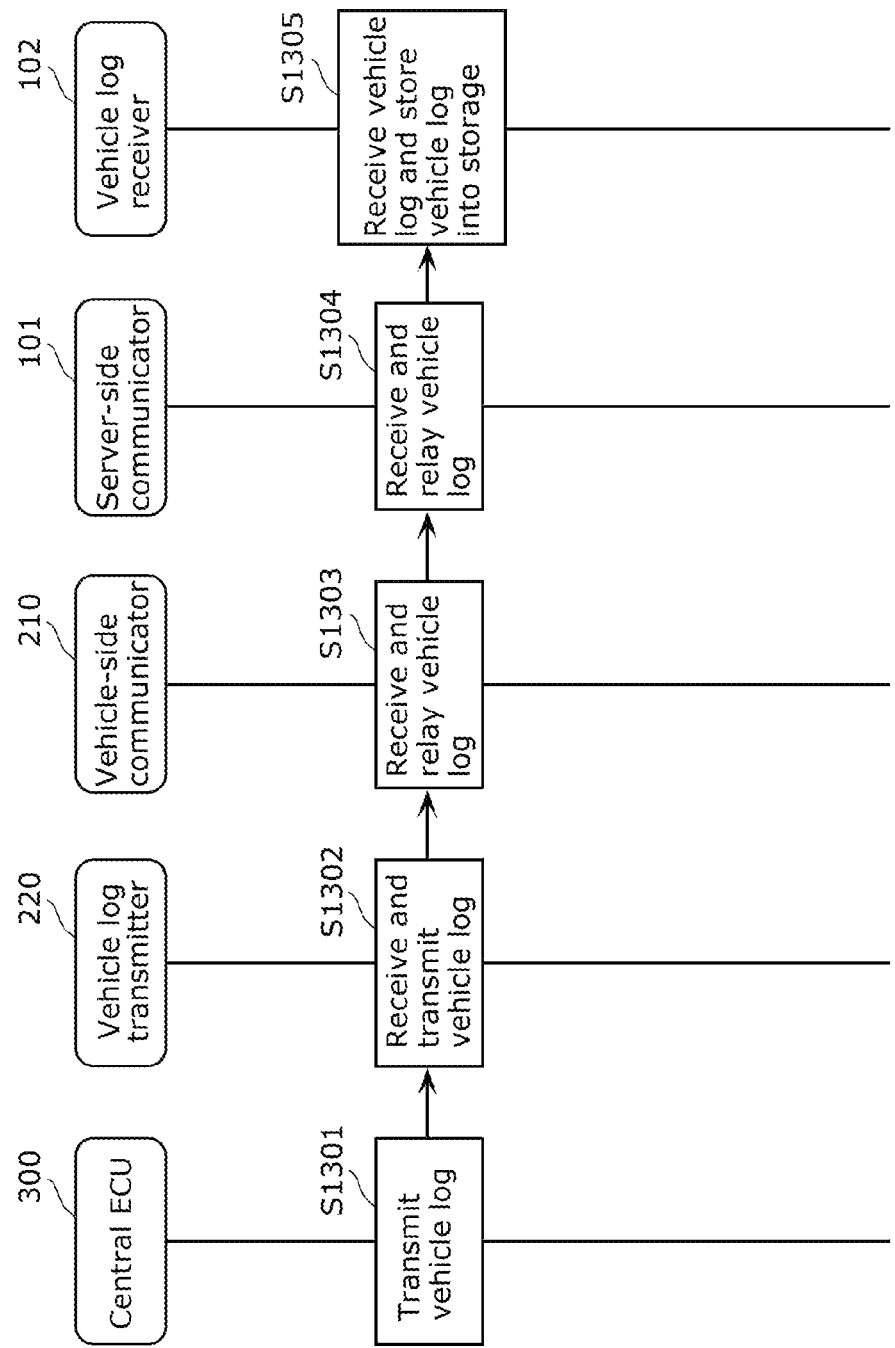
FIG. 13 is a diagram illustrating a sequence of a vehicle log receiving process according to the embodiment.

FIG. 13 illustrates a sequence of a process performed when anomalous vehicle detection server 10 receives a vehicle log from vehicle system 20 and stores the received vehicle log, according to the present embodiment.

(S1301) Central ECU 300 of vehicle system 20 collects a vehicle log via Ethernet 13 and transmits the collected vehicle log to vehicle log transmitter 220 of vehicle log transmission device 200.

(S1302) Vehicle log transmitter 220 of vehicle log transmission device 200 transmits the vehicle log to vehicle-side communicator 210.

(S1303) Vehicle-side communicator 210 of vehicle log transmission device 200 transmits the vehicle log to server-side communicator 101 of anomalous vehicle detection server 10 via the external network.

(S1304) Server-side communicator 101 of anomalous vehicle detection server 10 receives the vehicle log and transfers the received vehicle log to vehicle log receiver 102. Server-side communicator 101 receives a vehicle log from each of a plurality of vehicles and transfers each of the received plurality of vehicle logs to vehicle log receiver 102.

(S1305) Vehicle log receiver 102 of anomalous vehicle detection server 10 receives the vehicle log and stores the received vehicle log into vehicle log storage 103.

The operation illustrated in FIG. 13 may be executed periodically or may be executed in response to anomalous vehicle detection server 10 transmitting an instruction to a plurality of vehicles requesting that the plurality of vehicles each transmit a vehicle log.

14 Sequence of Exclusion Rule Receiving Process

Figure 14:
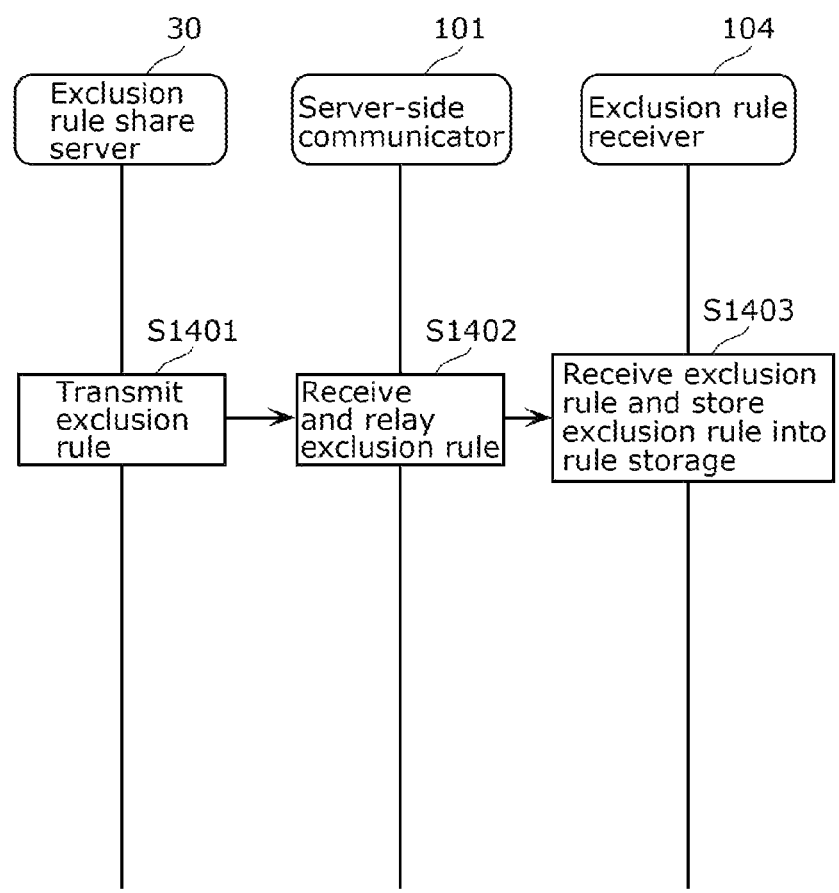
FIG. 14 is a diagram illustrating a sequence of a process performed when an anomalous vehicle detection server receives an exclusion rule from an exclusion rule share server and stores the received exclusion rule, according to the embodiment.

FIG. 14 illustrates a sequence of a process performed when anomalous vehicle detection server 10 receives an exclusion rule from exclusion rule share server 30 and stores the received exclusion rule, according to the present embodiment.

(S1401) Exclusion rule share server 30 transmits an exclusion rule to vehicle-side communicator 210 of anomalous vehicle detection server 10 via the external network.

(S1402) Server-side communicator 101 of anomalous vehicle detection server 10 receives the exclusion rule and transfers the received exclusion rule to exclusion rule receiver 104.

(S1403) Exclusion rule receiver 104 of anomalous vehicle detection server 10 receives the exclusion rule and stores the received exclusion rule into rule storage 105.

The operation illustrated in FIG. 14 may be executed periodically or may be executed in response to a trigger, and the trigger may be that anomalous vehicle detection server 10 receives vehicle logs from a plurality of vehicles, that anomalous vehicle detection server 10 transmits an instruction to a plurality of vehicles requesting that the plurality of vehicles each transmit a vehicle log, or that the operation illustrated in FIG. 15 described later is executed.

15 Sequence of Anomaly Score Calculating Process

Figure 15:
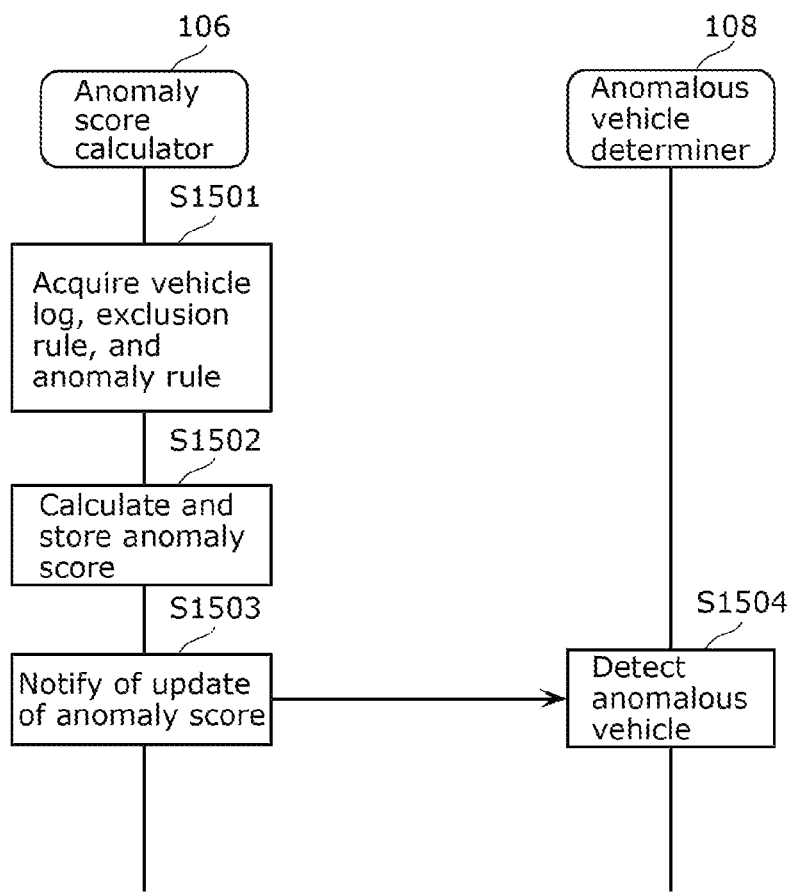
FIG. 15 is a diagram illustrating a sequence of an anomaly score calculating process according to the embodiment.

FIG. 15 illustrates a sequence of a process performed when anomalous vehicle detection server 10 calculates an anomaly score and detects an anomalous vehicle, according to the present embodiment.

(S1501) Anomaly score calculator 106 of anomalous vehicle detection server 10 acquires a vehicle log from vehicle log storage 103 and acquires an exclusion rule and an anomaly rule from rule storage 105.

(S1502) Anomaly score calculator 106 calculates an anomaly score based on the acquired vehicle log, the acquired exclusion rule, and the acquired anomaly rule and stores the calculated anomaly score into anomaly score storage 107. Anomaly score calculator 106 calculates an anomaly score for each of a plurality of vehicles and stores each of the calculated anomaly scores of the plurality of vehicles into anomaly score storage 107. For example, anomaly score calculator 106 may calculate the anomaly score for each anomaly category for each of the plurality of vehicles.

(S1503) After calculating the anomaly score, anomaly score calculator 106 notifies anomalous vehicle determiner 108 that the anomaly score has been updated. For example, after calculating the anomaly score for each of the plurality of vehicles, anomaly score calculator 106 notifies anomalous vehicle determiner 108 that the anomaly scores have been updated. Moreover, anomaly score calculator 106 may transmit, to anomalous vehicle determiner 108, information (e.g., the vehicle identifier or the like) for identifying the vehicle whose anomaly score has been updated along with the notification described above.

(S1504) Anomalous vehicle determiner 108 acquires the anomaly score from anomaly score storage 107 and detects an anomalous vehicle.

16 Sequence of Anomaly Countermeasure Taking Process

Figure 16:
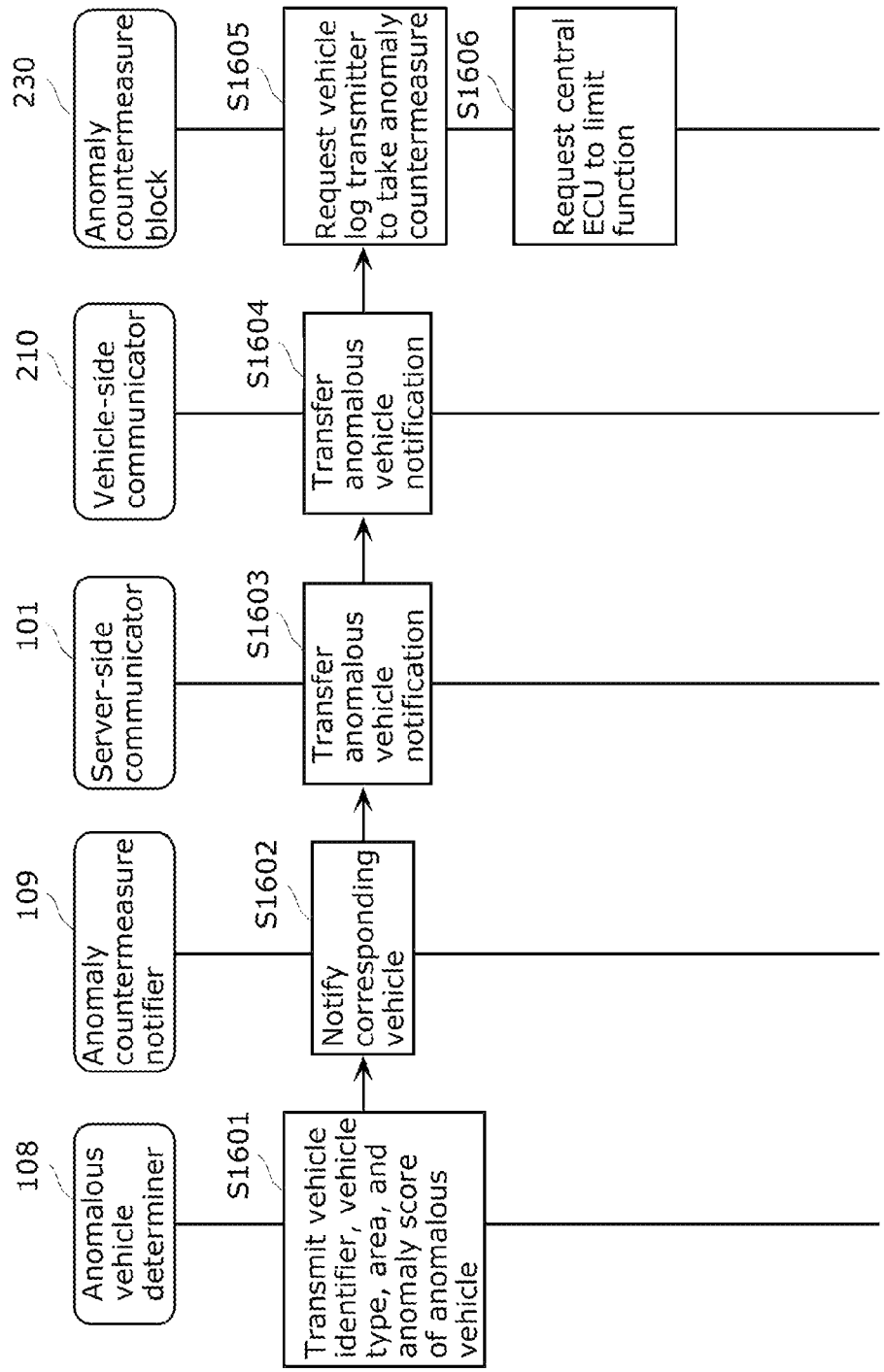
FIG. 16 is a diagram illustrating a sequence of an anomaly countermeasure taking process according to the embodiment.

FIG. 16 illustrates a sequence of a process performed when anomalous vehicle detection server 10 takes a countermeasure against an anomaly after detecting an anomalous vehicle, according to the present embodiment.

(S1601) Anomalous vehicle determiner 108 of anomalous vehicle detection server 10 transmits the vehicle identifier of the detected anomalous vehicle, its vehicle type, the area (e.g., the anomalous area), and the anomaly score to anomaly countermeasure notifier 109.

(S1602) Based on the information transmitted at step S1601, anomaly countermeasure notifier 109 of anomalous vehicle detection server 10 transmits a notification (an anomalous vehicle notification) to server-side communicator 101 in order to notify the corresponding vehicle that an anomaly has been detected. Anomaly countermeasure notifier 109 transmits a notification (an anomalous vehicle notification) to server-side communicator 101 in order to notify at least one of a vehicle corresponding to the received vehicle identifier of the anomalous vehicle, a vehicle of the same vehicle type as the received vehicle type of the anomalous vehicle, or a vehicle located in the same area as the received area of the anomalous vehicle that an anomaly has been detected. For example, at step S1602, anomaly countermeasure notifier 109 may transmit a notification to server-side communicator 101 in order to notify the anomalous vehicle and at least one of a vehicle of the same vehicle type as the anomalous vehicle or a vehicle located in the same area as the anomalous vehicle that an anomaly has been detected. This notification may include the anomaly score for each anomaly category.

(S1603) Server-side communicator 101 of anomalous vehicle detection server 10 transmits the notification (the anomalous vehicle notification) received at step S1602 to vehicle-side communicator 210 of vehicle log transmission device 200 via the external network.

(S1604) Vehicle-side communicator 210 of vehicle log transmission device 200 transmits the notification (the anomalous vehicle notification) received at step S1602 to anomaly countermeasure block 230.

(S1605) Anomaly countermeasure block 230 of vehicle log transmission device 200 requests vehicle log transmitter 220 to take a countermeasure against the anomaly. Anomaly countermeasure block 230 requests vehicle log transmitter 220 to take a countermeasure against the anomaly based on the notification (the anomalous vehicle notification) transmitted at step S1602 and the countermeasure rule illustrated in FIG. 9. For example, in a case where the anomaly category is the system analysis and the anomaly score in the anomaly category of the system analysis is greater than or equal to 10 but less than 20, anomaly countermeasure block 230 requests vehicle log transmitter 220 to increase the number of types of the vehicle log. In addition, for example, in a case where the anomaly category is the system analysis and the anomaly score in the anomaly category of the system analysis is greater than or equal to 20 but less than 30, anomaly countermeasure block 230 requests vehicle log transmitter 220 to increase the frequency at which the vehicle log is transmitted.

(S1606) Anomaly countermeasure block 230 of vehicle log transmission device 200 requests central ECU 300 to take a countermeasure against the anomaly via Ethernet 13. For example, anomaly countermeasure block 230 requests central ECU 300 to limit the vehicle control function (function limitation).

17 Sequence of Anomaly Displaying Process

Figure 17:
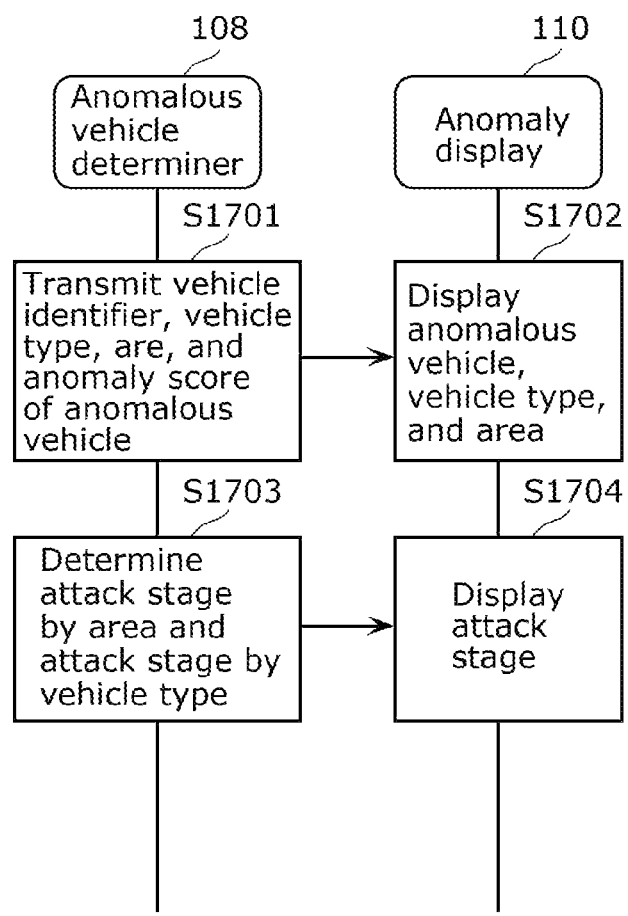
FIG. 17 is a diagram illustrating a sequence of an anomaly displaying process according to the embodiment.

FIG. 17 illustrates a sequence of a process performed when anomalous vehicle detection server 10 displays an anomaly to an operator after detecting an anomalous vehicle, according to the present embodiment.

(S1701) Anomalous vehicle determiner 108 of anomalous vehicle detection server 10 transmits the vehicle identifier of the detected anomalous vehicle, its vehicle type, and the area to anomaly display 110. Anomalous vehicle determiner 108 may further transmit the anomaly score to anomaly display 110.

(S1702) Anomaly display 110 of anomalous vehicle detection server 10 displays the received vehicle identifier of the anomalous vehicle, the received vehicle type, and the received area by use of a graphical user interface. In a case where anomaly display 110 has acquired the anomaly score from anomalous vehicle determiner 108, anomaly display 110 may display the acquired anomaly score as well by use of the graphical user interface.

(S1703) Anomalous vehicle determiner 108 of anomalous vehicle detection server 10 determines the attack stage by area and the attack stage by vehicle type and transmits the result of the determination to anomaly display 110. The method of determining the attack stage will be described later in detail.

(S1704) Anomaly display 110 of anomalous vehicle detection server 10 displays the received attack stage by use of the graphical user interface.

In this example, the processes at step S1703 and S1704 are optional. The process at step S1703 is executed if there is an anomalous vehicle.

18 Flowchart of Process of Calculating Anomaly Score by Vehicle

Figure 18:
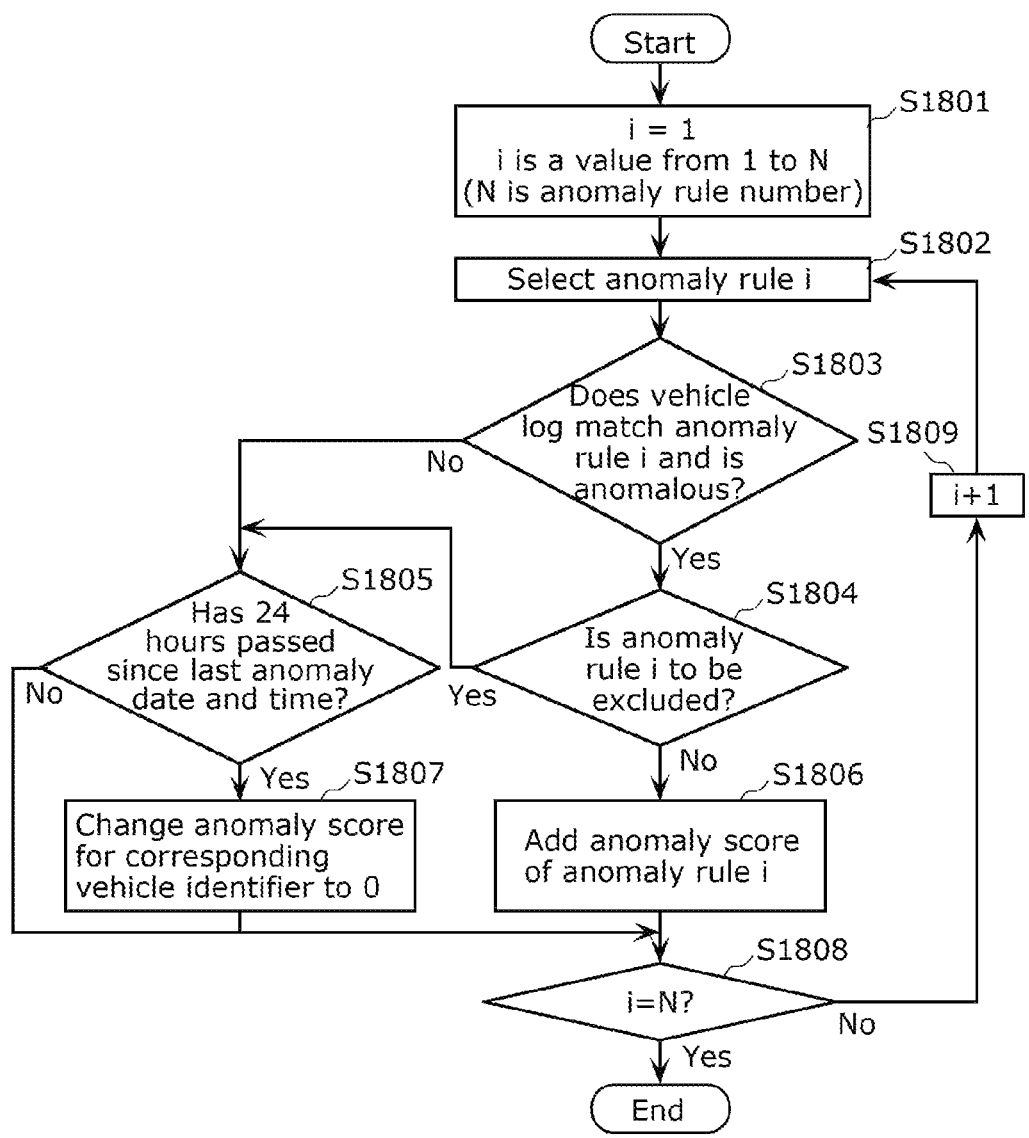
FIG. 18 is a flowchart of a process of calculating an anomaly score by vehicle according to the embodiment.

FIG. 18 illustrates a flowchart of a process of calculating an anomaly score by vehicle performed by anomaly score calculator 106 according to the present embodiment. Specifically, FIG. 18 illustrates a flowchart illustrating, in detail, a portion of the process at step S1502 shown in FIG. 15 and illustrating a process of calculating an anomaly score for each vehicle.

(S1801) Anomaly score calculator 106 prepares variable i and sets i=1. Then, anomaly score calculator 106 performs step S1802. In this example, variable i takes a value from 1 to N, and N represents the number of anomaly rules.

(S1802) Anomaly score calculator 106 selects anomaly rule i and performs step S1803.

(S1803) Anomaly score calculator 106 refers to the content of the event, the position information, the time, and the anomaly rule written in the vehicle log and determines whether the event in the vehicle log matches anomaly rule i and is thus anomalous. If anomaly score calculator 106 has determined that the event in the vehicle log matches anomaly rule i and is thus anomalous (Yes at S1803), anomaly score calculator 106 performs step S1804. Meanwhile, if anomaly score calculator 106 has determined that the event in the vehicle log does not match anomaly rule i and is thus not anomalous (No at S1803), anomaly score calculator 106 executes step S1805.

(S1804) Anomaly score calculator 106 refers to the content of the event, the position information, the time, and the exclusion rule written in the vehicle log and determines whether anomaly rule i is an anomaly rule to be excluded. If anomaly rule i is not an anomaly rule to be excluded (No at S1804), anomaly score calculator 106 executes step S1806. Meanwhile, if anomaly rule i is an anomaly rule to be excluded (Yes at S1804), anomaly score calculator 106 executes step S1805. This configuration can keep anomaly score calculator 106 from detecting an anomalous vehicle incorrectly while a work is being performed at a dealership or by a repair service provider in which a system error is likely to be resolved or while software is being updated in which the file count in the system is likely to increase.

(S1805) Anomaly score calculator 106 refers to the last anomaly date and time written in the anomaly score (see FIG. 8) and determines whether the current date and time indicates that 24 hours has passed since the last anomaly date and time. If the current date and time indicates that 24 hours has passed since the read-out last anomaly date and time (Yes at S1805), anomaly score calculator 106 performs step S1807. Meanwhile, if the current date and time indicates that 24 hours has not passed since the read-out last anomaly date and time (No at S1805), anomaly score calculator 106 performs step S1808. In other words, anomaly score calculator 106 calculates the anomaly score of the vehicle corresponding to the vehicle identifier written in the vehicle log with the anomaly score of anomaly rule i being excluded.

Even if a suspicious behavior has been detected (Yes at S1803), if the suspicious behavior is detected again within a predetermined period that is based on the time at which the suspicious behavior has been detected (No at S1805), anomaly score calculator 106 does not need to increase the anomaly score of the vehicle. In this example, the determination at step S1805 may be made based on whether a suspicious behavior has been detected within a predetermined area. In this case, even if a suspicious behavior has been detected (Yes at S1803), if the suspicious behavior is detected again within a predetermined area that is based on the area in which the suspicious behavior has been detected (No at S1805), anomaly score calculator 106 does not need to increase the anomaly score of the vehicle. The predetermined period may be a period that includes the time at which the suspicious behavior has been detected as the starting time of this period, for example.

(S1806) Anomaly score calculator 106 adds the anomaly score written in anomaly rule i to the anomaly score corresponding to the vehicle identifier written in the vehicle log and performs step S1808. In other words, anomaly score calculator 106 calculates the anomaly score of the vehicle corresponding to the vehicle identifier written in the vehicle log with the anomaly score of anomaly rule i being included.

(S1807) Anomaly score calculator 106 changes the anomaly score corresponding to the vehicle identifier written in the vehicle log to 0 and performs step S1808. This can be rephrased as anomaly score calculator 106 resets the anomaly score when anomaly rule i is an anomaly rule to be excluded and when the current date and time indicates that a predetermined time has passed since the last anomaly date and time.

In this example, it is not limited that anomaly score calculator 106 sets the anomaly score to 0 at step S1807, and anomaly score calculator 106 may lower the anomaly score. In this manner, if the suspicious behavior is not detected again in the vehicle in which the suspicious behavior has been detected within a predetermined period that includes the time at which the suspicious behavior has been detected, anomaly score calculator 106 may lower the anomaly score.

(S1808) Anomaly score calculator 106 determines whether anomaly rule i is N. In other words, anomaly score calculator 106 determines whether the processes at and after step S1803 have been performed for all anomaly rules i. If anomaly rule i is N (Yes at S1808), anomaly score calculator 106 terminates the process. Meanwhile, if anomaly rule i is not N (No at S1808), anomaly score calculator 106 performs step S1809.

(S1809) Anomaly score calculator 106 increments anomaly rule i by one and performs the processes at and after step S1802. Anomaly score calculator 106 performs the processes at and after step S1803 on next anomaly rule i.

In this example, if the determination result is Yes at step S1808, anomaly score calculator 106 may perform a predetermined arithmetic operation on the anomaly score for each vehicle and for each anomaly rule i. If the determination result is Yes at step S1808, anomaly score calculator 106 adds up the anomaly scores of all the anomaly rules. At this point, for example, anomaly score calculator 106 may add up the anomaly scores by each anomaly category (e.g., by network analysis, by system analysis). The total value of the anomaly scores calculated in this manner is an example of the anomaly score by vehicle.

19 Flowchart of Process of Calculating Anomaly Score by Vehicle Type

Figure 19:
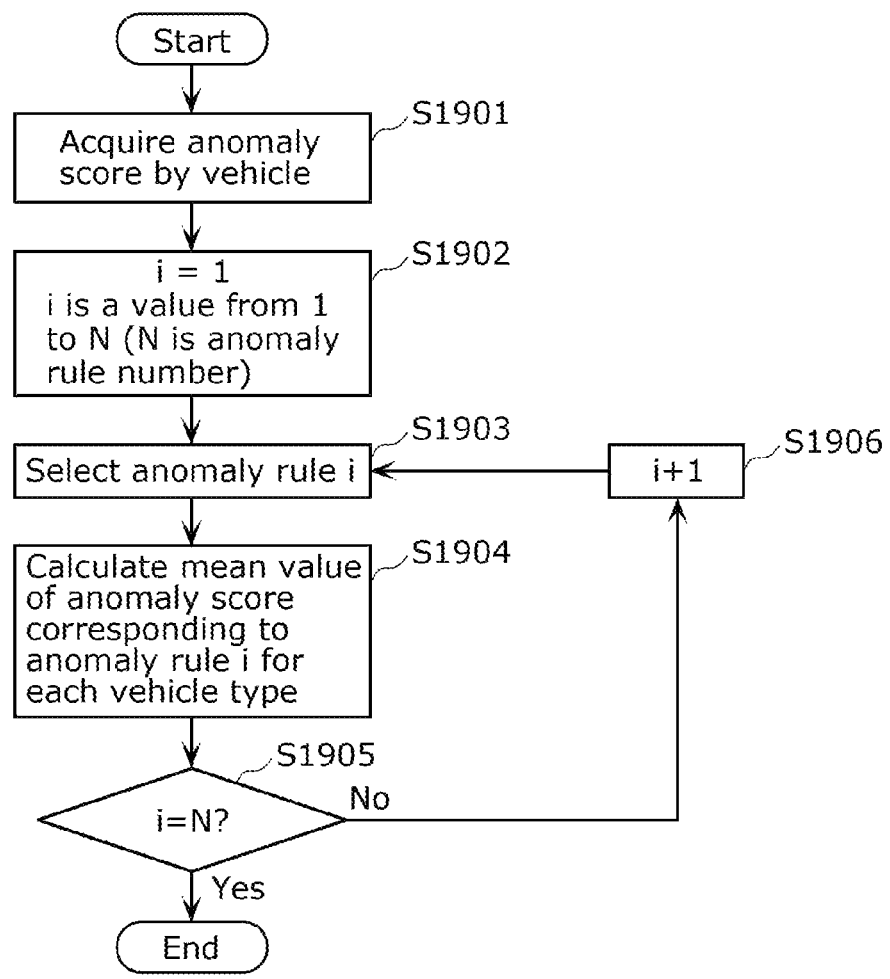
FIG. 19 is a flowchart of a process of calculating an anomaly score by vehicle type according to the embodiment.

FIG. 19 illustrates a flowchart of a process of calculating an anomaly score by vehicle type performed by anomaly score calculator 106 according to the present embodiment. Specifically, FIG. 19 illustrates a flowchart illustrating, in detail, a portion of the process at step S1502 shown in FIG. 15 and illustrating a process of calculating the statistical value (the mean value of the anomaly scores in the example shown in FIG. 19) for each vehicle type to be used by anomalous vehicle determiner 108 to determine whether a given vehicle is anomalous vehicle.

(S1901) Anomaly score calculator 106 acquires the anomaly score by vehicle from anomaly score storage 107. For example, anomaly score calculator 106 acquires the anomaly score by vehicle (e.g., the total value of the anomaly scores for each vehicle) calculated for each vehicle through the operation shown in FIG. 18.

(S1902) Anomaly score calculator 106 prepares variable i and sets i=1. Then, anomaly score calculator 106 performs step S1903. In this example, variable i takes a value from 1 to N, and N represents the number of anomaly rules.

(S1903) Anomaly score calculator 106 selects anomaly rule i and performs step S1904. For example, anomaly score calculator 106 selects anomaly rule i (the anomaly rule content) corresponding to variable i from the anomaly rule number (see FIG. 6). For example, if variable i=1, anomaly score calculator 106 selects the network device connection of which the anomaly rule number is 1.

(S1904) Anomaly score calculator 106 extracts the anomaly score corresponding to anomaly rule i from the anomaly score by vehicle of all the vehicles for each vehicle type and calculates the mean value of the extracted anomaly scores of all the vehicles. Anomaly score calculator 106 calculates the mean value of the anomaly scores in anomaly rule i of all the vehicles of the vehicle type as the anomaly score in anomaly rule i of this vehicle type.

In this example, the anomaly score in anomaly rule i of the vehicle type is not limited to the mean value, and any other statistical value may be used. The anomaly score in anomaly rule i of the vehicle type may be a maximum value, a minimum value, a median value, or a modal value or may be any other statistical value.

(S1905) Anomaly score calculator 106 determines whether variable i is N. If variable i is N (Yes at S1905), anomaly score calculator 106 terminates the process. Meanwhile, if variable i is not N (No at S1905), anomaly score calculator 106 performs step S1906.

(S1906) Anomaly score calculator 106 increments variable i by one and performs step S1903. Anomaly score calculator 106 performs the processes at and after step S1903 on next anomaly rule i.

In this example, if the determination result is Yes at step S1905, anomaly score calculator 106 may perform a predetermined arithmetic operation on the mean value of the anomaly scores for each vehicle type and for each anomaly rule i. If the determination result is Yes at step S1905, anomaly score calculator 106 calculates the mean value of all the anomaly scores for each vehicle type. At this point, for example, anomaly score calculator 106 may calculate the mean value of the anomaly scores by each anomaly category (e.g., by network analysis, by system analysis). The total value of the anomaly scores calculated in this manner is an example of the anomaly score by vehicle type.

20 Flowchart of Process of Calculating Anomaly Score by Area

Figure 20:
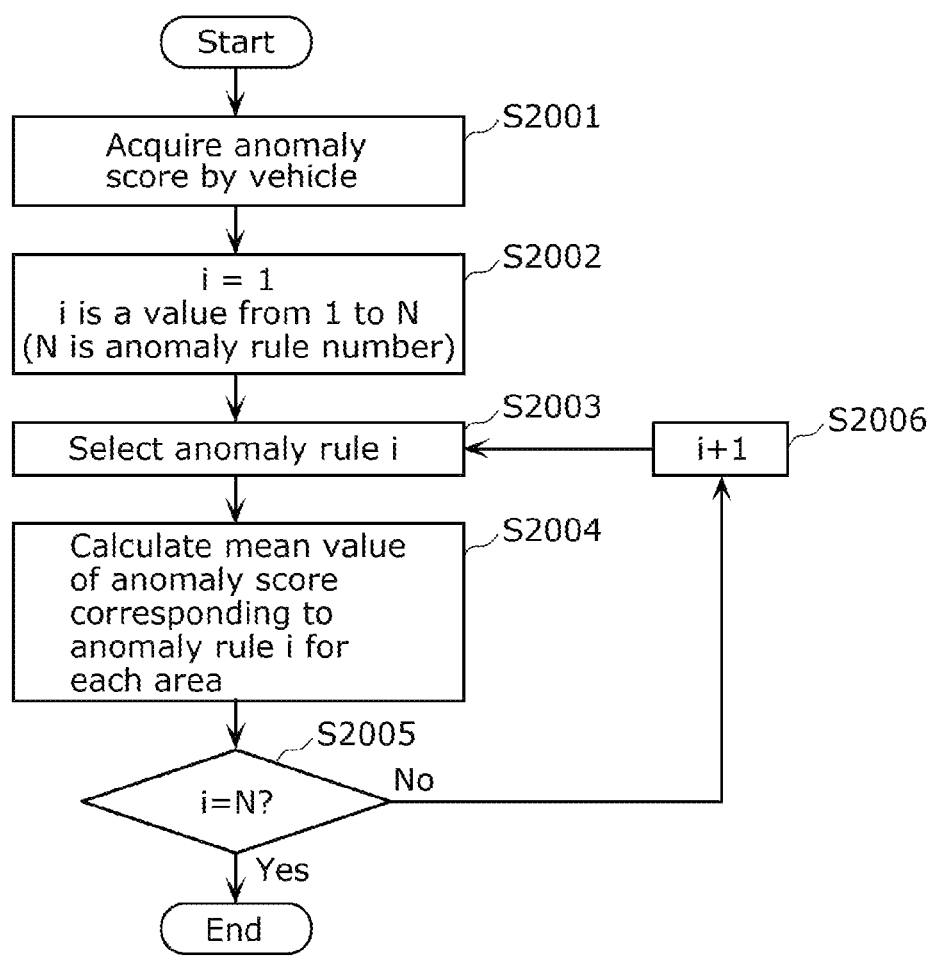
FIG. 20 is a flowchart of a process of calculating an anomaly score by area according to the embodiment.

FIG. 20 illustrates a flowchart of a process of calculating an anomaly score by area performed by anomaly score calculator 106 according to the present embodiment. Specifically, FIG. 20 illustrates a flowchart illustrating, in detail, a portion of the process at step S1502 shown in FIG. 15 and illustrating a process of calculating the statistical value (the mean value of the anomaly scores in the example shown in FIG. 20) for each area (e.g., an anomalous area) to be used by anomalous vehicle determiner 108 to determine whether a given vehicle is an anomalous vehicle. It is to be noted that steps S2001 to S2003, S2005, and S2006 shown in FIG. 20 are similar to, respectively, steps S1901 to S1903, S1905, and S1906 shown in FIG. 19, and thus their descriptions will be simplified.

(S2001) Anomaly score calculator 106 acquires the anomaly score by vehicle from anomaly score storage 107.

(S2002) Anomaly score calculator 106 prepares variable i and sets i=1. Then, anomaly score calculator 106 performs step S2003. In this example, variable i takes a value from 1 to N, and N represents the number of anomaly rules.

(S2003) Anomaly score calculator 106 selects anomaly rule i and performs step S2004.

(S2004) Anomaly score calculator 106 extracts the anomaly score corresponding to anomaly rule i from the anomaly score by vehicle of all the vehicles for each area and calculates the mean value of the extracted anomaly scores of all the vehicles. Anomaly score calculator 106 calculates the mean value of the anomaly scores in anomaly rule i of all the vehicles in the area as the anomaly score in anomaly rule i of this area.

In this example, the anomaly score in anomaly rule i of the area is not limited to the mean value, and any other statistical value may be used. The anomaly score in anomaly rule i of the area may be a maximum value, a minimum value, a median value, or a modal value or may be any other statistical value.

(S2005) If variable i is N (Yes at S2005), anomaly score calculator 106 terminates the process. Meanwhile, if variable i is not N (No at S2005), anomaly score calculator 106 performs step S2006.

(S2006) Anomaly score calculator 106 increments variable i by one and performs step S2003.

In this example, if the determination result is Yes at step S2005, anomaly score calculator 106 may perform a predetermined arithmetic operation on the mean value of the anomaly scores for each area and for each anomaly rule i. If the determination result is Yes at step S2005, anomaly score calculator 106 calculates the mean value of all the anomaly scores of all the vehicles located in this area for each area. At this point, for example, anomaly score calculator 106 may calculate the mean value of the anomaly scores by each anomaly category (e.g., by network analysis, by system analysis). The total value of the anomaly scores calculated in this manner is an example of the anomaly score by area.

21 Flowchart of Process of Detecting Anomalous Vehicle

Figure 21:
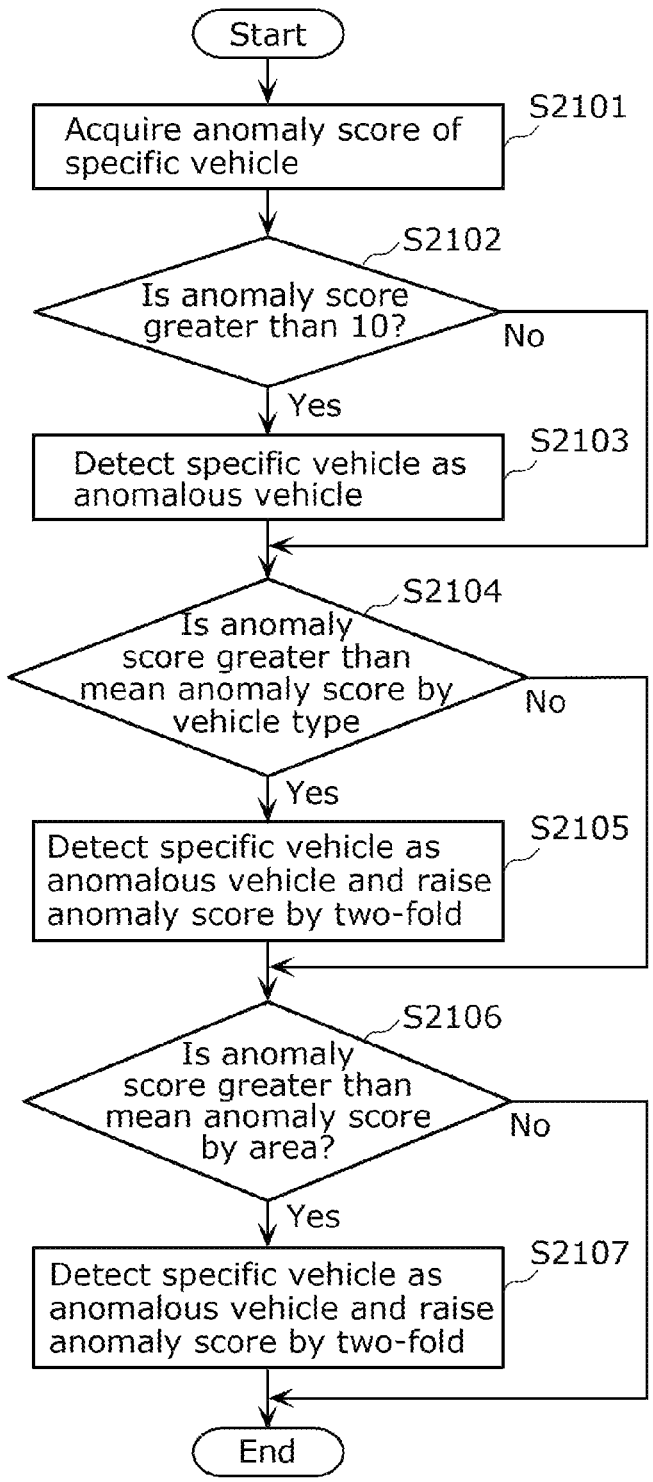
FIG. 21 is a flowchart of a process of determining an anomalous vehicle according to the embodiment.

FIG. 21 illustrates a flowchart of a process of detecting an anomalous vehicle performed by anomalous vehicle determiner 108 according to the present embodiment. Specifically, FIG. 21 is a flowchart illustrating, in detail, a portion of the process at step S1504 shown in FIG. 15.

(S2101) Anomalous vehicle determiner 108 selects a specific vehicle, acquires the anomaly score of the selected vehicle, and performs S2102. In this example, the anomaly score includes the anomaly score by vehicle, the anomaly score by vehicle type, and the anomaly score by area. The anomaly score of the specific vehicle is the total value of the anomaly scores with respect to the respective anomaly rules. Alternatively, the anomaly score of the specific vehicle may be the total value of the anomaly scores in the network analysis or the total value of the anomaly scores in the system analysis. Step S2101 is an example of an acquiring step.

(S2102) Anomalous vehicle determiner 108 determines whether the anomaly score is greater than 10. If the anomaly score is greater than 10 (Yes at S2102), anomalous vehicle determiner 108 performs step S2103. Meanwhile, if the anomaly score is not greater than 10 (No at S2102), anomalous vehicle determiner 108 performs step S2104. It is to be noted that the reference used for the determination at step S2102 is not limited to 10 and may be determined as appropriate. Step S2102 is an example of an anomalous vehicle determining step.

(S2103) If the determination result at step S2102 is Yes, anomalous vehicle determiner 108 detects the selected vehicle (the specific vehicle) as an anomalous vehicle and performs step S2104.

(S2104) Anomalous vehicle determiner 108 determines whether the anomaly score acquired at step S2101 is greater than the mean anomaly score by vehicle type of the same vehicle type as the selected vehicle (the specific vehicle). For example, at step S2104, anomalous vehicle determiner 108 compares the anomaly score of the vehicle against the statistical value that is based on the anomaly scores of the vehicles of the same vehicle type as the selected vehicle and determines whether the selected vehicle is an anomalous vehicle based on the comparison result. If the anomaly score is greater than the mean anomaly score by vehicle type of the same vehicle type as the selected vehicle (Yes at S2104), anomalous vehicle determiner 108 performs step S2105. Meanwhile, if the anomaly score is not greater than the mean anomaly score by vehicle type of the same vehicle type as the selected vehicle (No at S2104), anomalous vehicle determiner 108 performs step S2106. Step S2104 is an example of an anomalous vehicle determining step.

(S2105) Anomalous vehicle determiner 108 detects the selected vehicle (the specific vehicle) as an anomalous vehicle, increases the anomaly score acquired at step S2101 two-fold, stores the resulting anomaly score into anomaly score storage 107, and performs step S2106. Anomalous vehicle determiner 108 increases both the anomaly score related to the network analysis and the anomaly score related to the system analysis two-fold. Anomalous vehicle determiner 108 stores the resulting anomaly scores into anomaly score storage 107 as the anomaly score of the specific vehicle. This can be rephrased as anomalous vehicle determiner 108 updates the anomaly score of the specific vehicle based on the mean anomaly score by vehicle type. This configuration can make higher the anomaly score of the vehicle exhibiting a driving behavior different from a normal driving behavior among the vehicles of the same vehicle type, and thus the vehicle can be analyzed preferentially.

In this example, a normal driving behavior is a driving behavior that is assumed to be taken when a driver who is not performing reverse engineering drives a vehicle. Moreover, a driving behavior as used herein includes both a behavior in a driving state while the vehicle is traveling (e.g., the vehicle control function operation shown in FIG. 6) and a behavior in an internal process of the vehicle (e.g., the network device connection, the system error occurrence, and so on shown in FIG. 6). A normal driving behavior is an example of a predetermined driving behavior. The predetermined driving behavior may be a driving behavior that does not correspond to the anomaly rule, the period, and the number of occurrences shown in FIG. 6.

(S2106) Anomalous vehicle determiner 108 determines whether the anomaly score acquired at step S2101 is greater than the mean anomaly score by area of the area where the selected vehicle (the specific vehicle) is present. This can be rephrased as anomalous vehicle determiner 108 compares the anomaly score of the selected vehicle against the statistical value that is based on the anomaly scores of the vehicles located in the same area as the selected vehicle and determines whether the selected vehicle is an anomalous vehicle based on the comparison result. If the anomaly score is greater than the mean anomaly score by area of the area where the selected vehicle is present (Yes at S2106), anomalous vehicle determiner 108 performs step S2107. Meanwhile, if the anomaly score is not greater than the mean anomaly score by area of the area where the selected vehicle is present (No at S2106), anomalous vehicle determiner 108 terminates the process. Step S2106 is an example of an anomalous vehicle determining step.

(S2107) Anomalous vehicle determiner 108 detects the selected vehicle (the specific vehicle) at an anomalous vehicle, increases the anomaly score acquired at step S2101 or the anomaly score calculated at step S2105 two-fold, stores the resulting anomaly score into anomaly score storage 107, and terminates the process. Anomalous vehicle determiner 108 increases both the anomaly score related to the network analysis and the anomaly score related to the system analysis two-fold. Anomalous vehicle determiner 108 stores the resulting anomaly scores into anomaly score storage 107 as the anomaly score of the specific vehicle. This can be rephrased as anomalous vehicle determiner 108 updates the anomaly score of the specific vehicle based on the mean anomaly score by area. This configuration can make higher the anomaly score of the vehicle exhibiting a driving behavior different from a normal driving behavior (an example of a predetermined driving behavior) among the vehicles in the same area, and thus the operator can preferentially analyze the anomalous vehicle having a high anomaly score.

In this example, anomalous vehicle determiner 108 may detect an anomalous vehicle based on at least one of the determinations made at steps S2102, S2104, and S2106 shown in FIG. 21.

22 Flowchart of Process of Taking Countermeasure Against Anomaly

Figure 22:
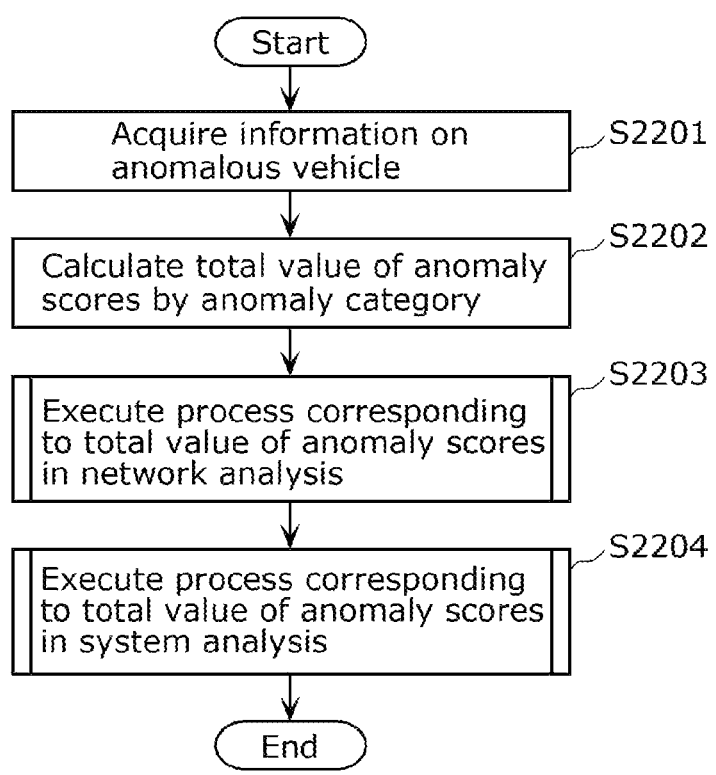
FIG. 22 is a flowchart of a process of taking a countermeasure against an anomaly according to the embodiment.

FIG. 22 illustrates a flowchart of a process of taking a countermeasure against an anomaly as performed by anomaly countermeasure notifier 109 according to the present embodiment. Specifically, FIG. 22 illustrates a flowchart of a process of determining the content of an anomalous vehicle notification to be issued at step S1602 shown in FIG. 16.

(S2201) Anomaly countermeasure notifier 109 acquires information on the anomalous vehicle detected by anomalous vehicle determiner 108 and performs step S2202. This information includes the anomaly score.

(S2202) Anomaly countermeasure notifier 109 refers to the anomaly score of the vehicle determined to be the anomalous vehicle, calculates the total value of the anomaly scores for each anomaly category, and performs step S2203.

(S2203) Anomaly countermeasure notifier 109 executes a process corresponding to the total value of the anomaly scores (an anomaly score total value) of which the anomaly category is the network analysis.

(S2204) Anomaly countermeasure notifier 109 executes a process corresponding to the total value of the anomaly scores (an anomaly score total value) of which the anomaly category is the system analysis.

Figure 23:
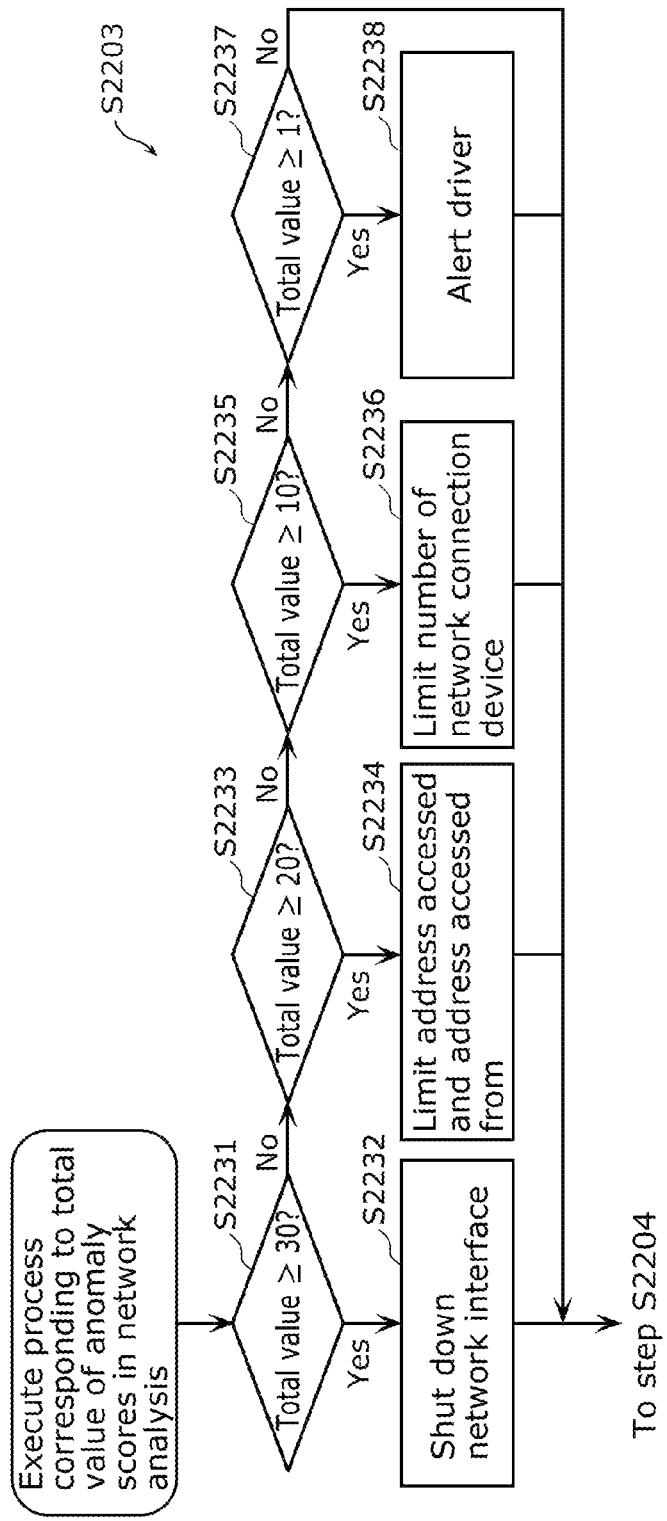
FIG. 23 is an example of a flowchart of a process of taking a countermeasure against an anomaly by anomaly category according to the embodiment.

Now, steps S2203 and S2204 shown in FIG. 22 will be described in detail with reference to FIG. 23 and FIG. 24. FIG. 23 illustrates an example of a flowchart of a process of taking a countermeasure against an anomaly by anomaly category according to the present embodiment. FIG. 23 is an example of a flowchart that illustrates the details of step S2203 shown in FIG. 22. It is to be noted that FIG. 23 illustrates a process performed by use of the anomaly score, among the anomaly scores, in the network analysis. In other words, in the process illustrated in FIG. 23, the anomaly score in the system analysis, among the anomaly scores, is not used. Moreover, the operation illustrated in FIG. 23 may be executed if the attack stage is determined to be the second attack stage in the anomalous vehicle or in the anomalous area.

(S2231) Anomaly countermeasure notifier 109 determines whether the anomaly category in the network analysis is greater than or equal to 30 (a first threshold value). If the anomaly category is greater than or equal to 30 (Yes at S2231), anomaly countermeasure notifier 109 performs step S2232.

(S2233) If the anomaly category is less than 30 (No at S2231), anomaly countermeasure notifier 109 determines whether the anomaly category is greater than or equal to 20 (a second threshold value smaller than the first threshold value). If the anomaly category is less than 30 but greater than or equal to 20 (Yes at S2233), anomaly countermeasure notifier 109 performs step S2234.

(S2235) If the anomaly category is less than 20 (No at S2233), anomaly countermeasure notifier 109 determines whether the anomaly category is greater than or equal to 10 (a third threshold value smaller than the second threshold value). If the anomaly category is less than 20 but greater than or equal to 10 (Yes at S2235), anomaly countermeasure notifier 109 performs step S2236.

(S2237) If the anomaly category is less than 10 (No at S2235), anomaly countermeasure notifier 109 determines whether the anomaly category is greater than or equal to 1 (a fourth threshold value smaller than the third threshold value). If the anomaly category is greater than or equal to 1 (Yes at S2237), anomaly countermeasure notifier 109 performs step S2238. Meanwhile, if the anomaly category is 0 (No at S2237), anomaly countermeasure notifier 109 performs step S2204 without taking any countermeasure.

(S2232) Anomaly countermeasure notifier 109 shuts down the network interface and performs S2204.

(S2234) Anomaly countermeasure notifier 109 limits the address being accessed and the address being accessed from and performs S2204.

(S2236) Anomaly countermeasure notifier 109 limits the number of connected network devices and performs S2204.

(S2238) Anomaly countermeasure notifier 109 alerts the driver and performs S2204.

In this manner, anomaly countermeasure notifier 109 determines the countermeasure to be taken such that the limitation in the network becomes more tightened as the anomaly score in the network analysis is higher. It is to be noted that the first threshold value to the fourth threshold value described above are examples, and the numerical values are not limited to those exemplified above.

In this example, anomaly countermeasure notifier 109 may execute a process corresponding to a value that is less than or equal to the anomaly score total value, in addition to the process corresponding to the anomaly score total value in the network analysis. For example, if the determination result at step S2231 is Yes, anomaly countermeasure notifier 109 may perform, in addition to the process at step S2232, at least one of the processes at steps S2234, S2236, and S2238.

Figure 24:
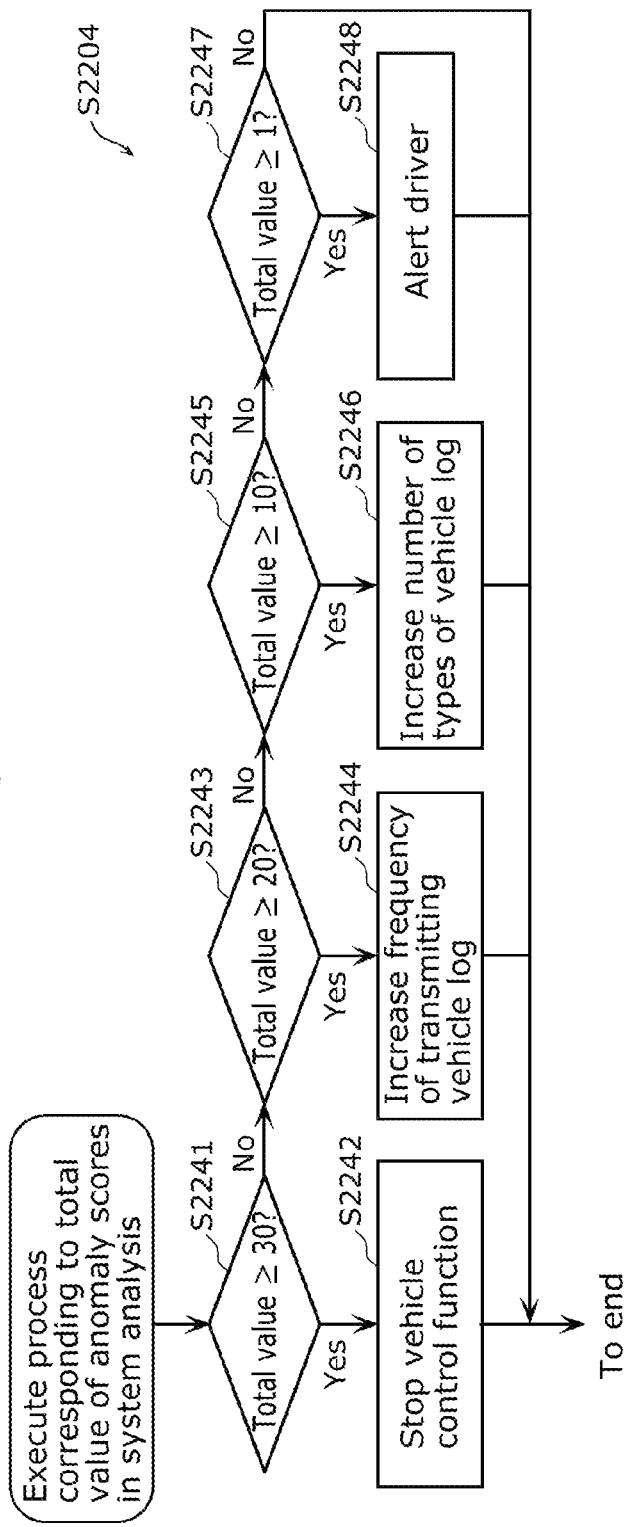
FIG. 24 is another example of a flowchart of a process of taking a countermeasure against an anomaly by anomaly category according to the embodiment.

FIG. 24 illustrates another example of a flowchart of a process of taking a countermeasure against an anomaly by anomaly category according to the present embodiment. FIG. 24 is an example of a flowchart that illustrates the details of step S2204 shown in FIG. 22. It is to be noted that FIG. 24 illustrates a process performed by use of the anomaly score, among the anomaly scores, in the system analysis. In other words, in the process shown in FIG. 24, the anomaly score in the network analysis, among the anomaly scores, is not used. Moreover, the operation illustrated in FIG. 24 may be executed if the attack stage is determined to be the second attack stage in the anomalous vehicle or in the anomalous area.

(S2241) Anomaly countermeasure notifier 109 determines whether the anomaly category in the system analysis is greater than or equal to 30 (a fifth threshold value). If the anomaly category is greater than or equal to 30 (Yes at S2241), anomaly countermeasure notifier 109 performs step S2242.

(S2243) If the anomaly category is less than 30 (No at S2241), anomaly countermeasure notifier 109 determines whether the anomaly category is greater than or equal to 20 (a sixth threshold value smaller than the fifth threshold value). If the anomaly category is less than 30 but greater than or equal to 20 (Yes at S2243), anomaly countermeasure notifier 109 performs step S2244.

(S2245) If the anomaly category is less than 20 (No at S2243), anomaly countermeasure notifier 109 determines whether the anomaly category is greater than or equal to 10 (a seventh threshold value smaller than the sixth threshold value). If the anomaly category is less than 20 but greater than or equal to 10 (Yes at S2245), anomaly countermeasure notifier 109 performs step S2246.

(S2247) If the anomaly category is less than 10 (No at S2245), anomaly countermeasure notifier 109 determines whether the anomaly category is greater than or equal to 1 (an eighth threshold value smaller than the seventh threshold value). If the anomaly category is greater than or equal to 1 (Yes at S2247), anomaly countermeasure notifier 109 performs step S2248. Meanwhile, if the anomaly category is 0 (No at S2247), anomaly countermeasure notifier 109 terminates the process without taking any countermeasure.

(S2242) Anomaly countermeasure notifier 109 stops the vehicle control function and terminates the process.

(S2244) Anomaly countermeasure notifier 109 increases the frequency at which the vehicle log is transmitted to anomalous vehicle detection server 10 and terminates the process.

(S2246) Anomaly countermeasure notifier 109 increases the number of types of the vehicle log to be transmitted to anomalous vehicle detection server 10 and terminates the process.

(S2248) Anomaly countermeasure notifier 109 alerts the driver and terminates the process.

In this manner, anomaly countermeasure notifier 109 determines the countermeasure such that the limitation in vehicle system 20 becomes more tightened as the anomaly score in the system analysis is higher. It is to be noted that the fifth threshold value to the eighth threshold value described above are examples, and the numerical values are not limited to those exemplified above.

In this example, anomaly countermeasure notifier 109 may execute a process corresponding to a value that is less than or equal to the anomaly score total value, in addition to the process corresponding to the anomaly score total value in the system analysis. For example, if the determination result at step S2241 is Yes, anomaly countermeasure notifier 109 may perform, in addition to the process at step S2242, at least one of the processes at steps S2244, S2246, and S2248.

As illustrated in FIG. 23 and FIG. 24, anomaly countermeasure notifier 109 may request a vehicle of the same vehicle type as the vehicle determined to be an anomalous vehicle or a vehicle located in the anomalous area where the vehicle determined to be an anomalous vehicle is located to be subjected to any one or more of the shutdown of a network interface, the limiting of the address being accessed and the address being accessed from, the limiting of the number of network devices to be connected, the alerting to the driver, the limiting of the network connection, the limiting of the vehicle control function, the stopping of the vehicle control function from starting, an increase in the frequency at which the vehicle log is transmitted, an increase in the number of types of the vehicle log, and the notification to the driver based on the value of the anomaly score (e.g., the value of the anomaly score of the vehicle determined to be an anomalous vehicle) or the type of the suspicious behavior (e.g., the network analysis or the system analysis). The one or more requests are made to the anomalous vehicle, the vehicle of the same vehicle type as the vehicle determined to the anomalous vehicle, and vehicles other than the anomalous vehicle that are located in the anomalous area.

23 Flowchart of Process of Determining Attack Stage by Area

Figure 25:
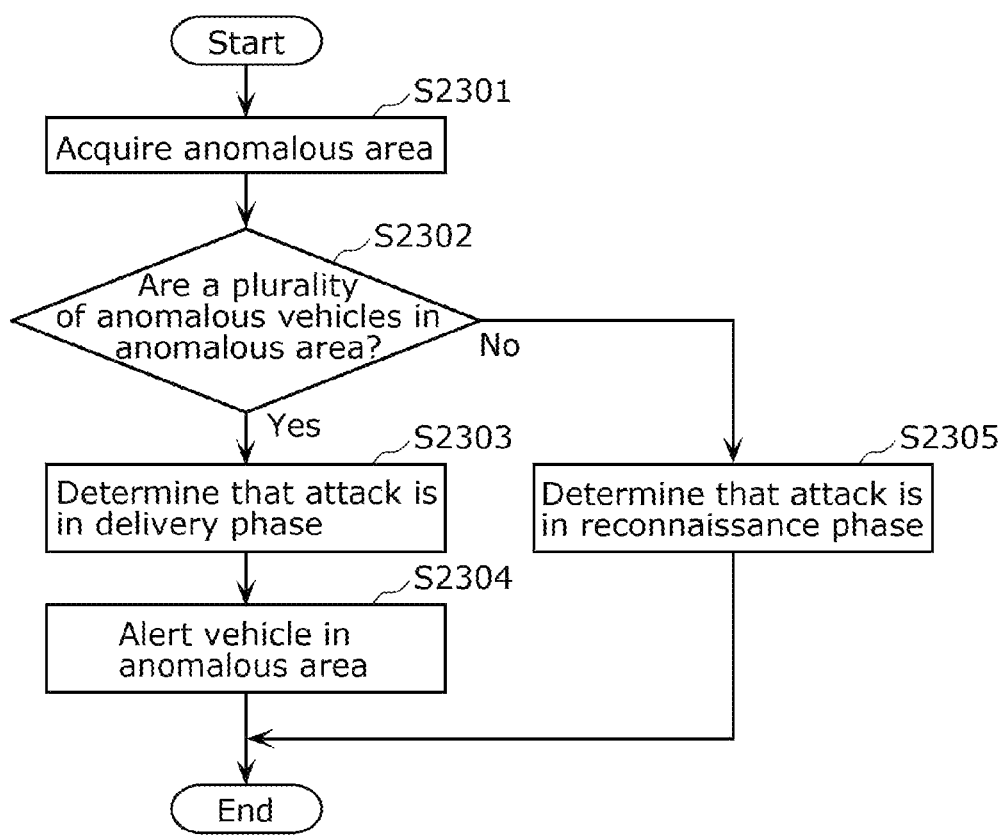
FIG. 25 is a flowchart of a process of determining an attack stage by area according to the embodiment.

FIG. 25 illustrates a flowchart of a process of determining an attack stage by area as performed by anomalous vehicle determiner 108 according to the present embodiment. Specifically, FIG. 25 is a flowchart illustrating an example of a process of determining the degree of progress of an attack being perpetrated by an attacker. The process illustrated in FIG. 25 may be performed in parallel with the process illustrated in FIG. 22, for example.

(S2301) Anomalous vehicle determiner 108 acquires information on the detected anomalous vehicle, acquires the position information on the position where the anomalous vehicle has been detected as the anomalous area, and performs step S2302.

(S2302) Anomalous vehicle determiner 108 determines whether a plurality of anomalous vehicles are present in the anomalous area acquired at step S2301. If a plurality of anomalous vehicles are present in the anomalous area aside from the anomalous vehicle acquired at step S2301 (Yes at S2302), anomalous vehicle determiner 108 performs step S2303. Meanwhile, if no anomalous vehicle other than the anomalous vehicle acquired at step S2301 is present in the anomalous area (No at S2302), anomalous vehicle determiner 108 performs step S2305. In this example, anomalous vehicle determiner 108 may make the determination of Yes at step S2302 if a predetermined number or more of anomalous vehicles are present in the anomalous vehicle aside from the anomalous vehicle acquired at step S2301 and may make the determination of No at step S2302 if the number of the anomalous vehicles present in the anomalous area other than the anomalous vehicle acquired at step S2301 is less than the predetermined number.

(S2303) If the determination result is Yes at step S2302, anomalous vehicle determiner 108 determines that the attack perpetrated in the anomalous area where the anomalous vehicle has been detected is in the delivery phase (an example of the second attack stage).

(S2304) If the attack is in the delivery phase, anomalous vehicle determiner 108 alerts the vehicles in the anomalous area via anomaly countermeasure notifier 109 and terminates the process. Anomalous vehicle determiner 108 transmits, to the vehicles in the anomalous area, information for notifying the drivers that the attack is in the delivery phase. For example, anomalous vehicle determiner 108 alerts all the vehicles located in the anomalous area. This can be rephrased as anomalous vehicle determiner 108 alerts each of the one or more vehicles that are not the anomalous vehicle, for example. The information to be provided may further include information for taking a countermeasure against the anomaly. For example, the information to be provided may include information for executing at least one of steps S2232, S2234, S2236, and S2238 shown in FIG. 23 and steps S2242, S2244, S2246, and S2248 shown in FIG. 24.

(S2305) Anomalous vehicle determiner 108 determines that the attack perpetrated in the anomalous area where the anomalous vehicle has been detected is in the reconnaissance phase (an example of the first attack stage) and terminates the process. For example, anomalous vehicle determiner 108 refrains from alerting the vehicle or vehicles other than the anomalous vehicle in the anomalous area. In this example, upon anomalous vehicle determiner 108 making the determination at step S2305, anomaly countermeasure notifier 109 may transmit information indicating that the attack is currently in the reconnaissance phase to the vehicle or vehicles.

In this manner, anomalous vehicle determiner 108 determines that the attack is in the first attack stage if no more than a predetermined number of anomalous vehicles are present in the anomalous area where the anomalous vehicle has been detected and determines that the attack is in the second attack stage that is a more advanced stage of the attack in the reverse engineering than the first attack stage if more than a predetermined number of anomalous vehicles are present in the anomalous area where the anomalous vehicle has been detected. Then, if the attack is in the second attack stage, the vehicles in the anomalous area are alerted.

24 Flowchart of Process of Determining Attack Stage by Area

Figure 26:
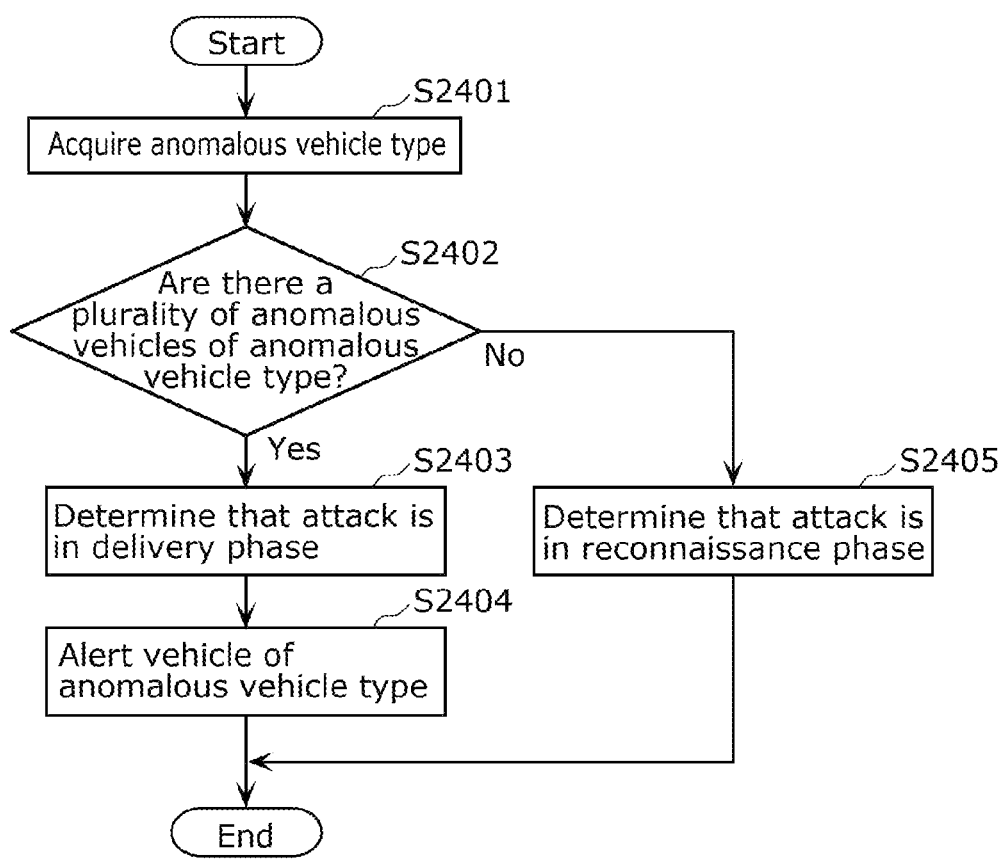
FIG. 26 is a flowchart of a process of determining an attack stage by vehicle type according to the embodiment.

FIG. 26 illustrates a flowchart of a process of determining an attack stage by vehicle type as performed by anomalous vehicle determiner 108 according to the present embodiment. Specifically, FIG. 26 is a flowchart illustrating another example of a process of determining the degree of progress of an attack being perpetrated by an attacker.

(S2401) Anomalous vehicle determiner 108 acquires information on the detected anomalous vehicle, acquires the vehicle type of the anomalous vehicle as the anomalous vehicle type based on the acquired information, and performs step S2402.

(S2402) Anomalous vehicle determiner 108 determines whether a plurality of anomalous vehicles are present with respect to the anomalous vehicle type acquired at step S2401. If a plurality of anomalous vehicles are present with respect to the anomalous vehicle type aside from the anomalous vehicle acquired at step S2401 (Yes at S2402), anomalous vehicle determiner 108 performs step S2403. Meanwhile, if no anomalous vehicle other than the anomalous vehicle acquired at step S2401 is present with respect to the anomalous vehicle type (No at S2402), anomalous vehicle determiner 108 performs step S2405. In this example, anomalous vehicle determiner 108 may make the determination of Yes at step S2402 if a predetermined number or more of anomalous vehicles are present with respect to the anomalous vehicle type aside from the anomalous vehicle acquired at step S2401 and may make the determination of No at step S2402 if the number of the anomalous vehicles present with respect to the anomalous vehicle type other than the anomalous vehicle acquired at step S2401 is less than the predetermined number.

(S2403) If the determination result is Yes at step S2402, anomalous vehicle determiner 108 determines that the attack perpetrated on the vehicle type of the anomalous vehicle is in the delivery phase (an example of the second attack stage).

(S2404) If the attack is in the delivery phase, anomalous vehicle determiner 108 alerts the vehicles for the anomalous vehicle type via anomaly countermeasure notifier 109 and terminates the process. Anomalous vehicle determiner 108 transmits, to the vehicles of the anomalous vehicle type, information for notifying the drivers that the attack is in the delivery phase. For example, anomalous vehicle determiner 108 alerts all the vehicles of the anomalous vehicle type. This can be rephrased as anomalous vehicle determiner 108 alerts each of the one or more vehicles that are not the anomalous vehicle but of the anomalous vehicle type, for example. The information to be provided may further include information for taking a countermeasure against the anomaly. The information to be provided may include information for executing at least one of steps S2232, S2234, S2236, and S2238 shown in FIG. 23 and steps S2242, S2244, S2246, and S2248 shown in FIG. 24.

(S2405) Anomalous vehicle determiner 108 determines that the attack perpetrated on the vehicle type of the anomalous vehicle is in the reconnaissance phase (an example of the first attack stage) and terminates the process. For example, anomalous vehicle determiner 108 refrains from alerting the vehicle or vehicles other than the anomalous vehicle but of the anomalous vehicle type. In this example, upon anomalous vehicle determiner 108 making the determination at step S2405, anomaly countermeasure notifier 109 may transmit information indicating that the attack is currently in the reconnaissance phase to the vehicle or vehicles.

In this manner, anomalous vehicle determiner 108 determines that the attack is in the first attack stage if no more than a predetermined number of anomalous vehicles are present with respect to the vehicle type of which the anomalous vehicle has been detected (the anomalous vehicle type) and determines that the attack is in the second attack stage that is a more advanced stage of the attack in the reverse engineering than the first attack stage if more than a predetermined number of anomalous vehicles are present with respect to the vehicle type of which the anomalous vehicle has been detected. Then, if the attack is in the second attack stage, the vehicles of the anomalous vehicle type are alerted.

In the example described above, the first attack stage is the reconnaissance phase, and the second attack stage is the delivery phase. The first attack stage and the second attack stage, however, are not limited to these examples. When the cyber kill chain shown in FIG. 12 is used as an example, the second attack stage is a stage different from the first attack stage, and there is no particular limitation on the second attack stage as long as the degree of progress of the attack in the second attack stage is more advanced (in a higher phase) than the degree of progress of the attack in the first attack stage.

Other Variations

The present disclosure has been described based on the foregoing embodiment. It is needless to say, however, that the present disclosure is not limited to the foregoing embodiment. The cases such as the following are also encompassed by the present disclosure.

(1) In the foregoing embodiment, described is a security countermeasure in an in-vehicle network provided in an automobile, but the applicable scope of the present disclosure is not limited thereto. The present disclosure may be applied not only to automobiles but also to mobilities, including construction machines, agricultural machines, ships, railroad vehicles, or aircrafts.

In other words, the present disclosure can be applied as a cybersecurity countermeasure in a mobility network and a mobility network system.

Moreover, the present disclosure may be applied to a communication network used in an industrial control system of a plant, a building, or the like or to a communication network for controlling an embedded device.

(2) In the foregoing embodiment, the value of the period, the value of the number of occurrences, and the value of the anomaly score written in an anomaly rule may be modified. There is no particular limitation on these values as long as the anomaly scores are added if a specific condition indicating a suspicion of an attack is met.

(3) In the foregoing embodiment, anomaly score calculator 106 calculates the anomaly score for each anomaly rule. Alternatively, anomaly score calculator 106 may calculate the total value of the anomaly scores corresponding to all the anomaly rules.

(4) In the foregoing embodiment, anomaly score calculator 106 calculates the mean value of the anomaly scores for each vehicle type and for each area. Alternatively, anomaly score calculator 106 may use a statistical value such as a total value or a median value.

(5) In the foregoing embodiment, the anomaly score list display screen displays the anomaly scores in descending order. Alternatively, the anomaly score list display screen may be provided with a function that allows the anomaly scores to be sorted in ascending order or descending order.

(6) In the foregoing embodiment, the anomaly score map display screen displays an anomalous area and an anomalous vehicle on a map. Alternatively, the anomaly score map display screen may display a plurality of anomalous areas and a plurality of anomalous vehicles and may also display anomaly scores.

(7) In the foregoing embodiment, the anomaly score stage display screen displays the degree of progress of an attack on a specific anomalous vehicle by stage. Alternatively, the anomaly score stage display screen does not need to display all the stages and may display only the reconnaissance phase.

(8) In the foregoing embodiment, the anomaly score is set to 0 if 24 hours has passed since the last anomaly date and time in the flowchart of the process of calculating the anomaly score. The duration does not necessarily have to be 24 hours and may be a predetermined time. Moreover, the anomaly score does not necessarily have to be set to 0 and may simply be reduced.

(9) In the foregoing embodiment, the anomaly score is increased two-fold if the anomaly score is greater than the mean anomaly score by vehicle type or if the anomaly score is greater than the mean anomaly score by area in the flowchart of the process of detecting an anomalous vehicle. The anomaly score does not necessarily have to be increased two-fold and may simply be increased by adding a fixed value to the anomaly score, for example.

(10) In the foregoing embodiment, the attack is determined to be in the reconnaissance phase if there is only one anomalous vehicle and determined to be in the delivery phase if there are a plurality of anomalous vehicles in the flowchart of the process of determining the attack stage by area and in the flowchart of the process of determining the attack stage by vehicle type. The number of anomalous vehicles to serve as the determination criterion does not have to be one and may be a predetermined value.

(11) Each device in the foregoing embodiment is specifically a computer system that includes, for example, a microprocessor, a ROM, a RAM, a hard disk unit, a display unit, a keyboard, and a mouse. The RAM or the hard disk unit has a computer program recorded thereon. The microprocessor operates in accordance with the computer program, and thus each device implements its function. In this example, a computer program includes a plurality of command codes providing instructions to a computer to implement a predetermined function.

(12) A part or the whole of the constituent elements included in each device according to the foregoing embodiment may be implemented by a single system large scale integration (LSI). A system LSI is an ultra-multifunctional LSI manufactured by integrating a plurality of components on a single chip and is specifically a computer system that includes, for example, a microprocessor, a ROM, and a RAM. The RAM has a computer program recorded thereon. The microprocessor operates in accordance with the computer program, and thus the system LSI implements its function.

Each unit of the constituent elements of each device described above may be implemented by a single chip, or a part or the whole of such constituent elements may be implemented by a single chip.

Although the term a system LSI is used herein, depending on the difference in the degree of integration, it may also be called an IC, an LSI, a super LSI, or an ultra LSI. The technique for circuit integration is not limited to the LSI, and an integrated circuit may be implemented by a dedicated circuit or a general purpose processor. A field programmable gate array (FPGA) that can be programmed after an LSI is manufactured or a reconfigurable processor in which the connection or the setting of the circuit cells within the LSI can be reconfigured may also be used.

Furthermore, when a technique for circuit integration that replaces an LSI appears through the advancement in the semiconductor technology or through a derived different technique, the functional blocks may be integrated by use of such different techniques. An application of biotechnology is a possibility.

(13) A part or the whole of the constituent elements in each device described above may be implemented by an IC card or a single module that can be attached to or detached from each device. The IC card or the module is a computer system that includes, for example, a microprocessor, a ROM, and a RAM. The IC card or the module may include the ultra-multifunctional LSI described above. The microprocessor operates in accordance with a computer program, and thus the IC card or the module implements its function. The IC card or the module may be tamper resistant.

(14) The present disclosure may be implemented as the methods described above. In addition, the present disclosure may provide a computer program that causes a computer to implement the aforementioned methods or digital signals composed of the computer program.

The present disclosure may also be implemented in the form of a computer readable recording medium having the computer program or the digital signals recorded thereon, and examples of such a computer readable recording medium include a flexible disk, a hard disk, a CD-ROM, an MO, a DVD, a DVD-ROM, a DVD-RAM, a Blue-ray (BD) (registered trademark) disc, and a semiconductor memory. Moreover, the present disclosure may be the digital signals recorded one any of the aforementioned recording media.

According to the present disclosure, the computer program or the digital signals may be transmitted via an electric communication circuit, a wireless or wired communication circuit, a network represented by the internet, data broadcast, or the like.

The present disclosure may provide a computer system that includes a microprocessor and a memory. The memory may have the computer program described above recorded thereon, and the microprocessor may operate in accordance with the computer program.

Alternatively, the program or the digital signals may be recorded onto a recording medium, which may then be transported, or the program or the digital signals may be transported via a network or the like. Thus, the program or the digital signals may be executed by a separate stand-alone computer system.

(15) In addition, the order of the plurality of processes described in the foregoing embodiment is merely an example. The order of the plurality of processes may be modified, or the plurality of processes may be executed in parallel. Moreover, one or more of the plurality of processes may be omitted.

(16) The anomalous vehicle detection server according to the foregoing embodiment may be an anomalous vehicle detection server that receives, from one or more vehicles, a vehicle log including data on the content of an event that has occurred in the vehicle system. The anomalous vehicle detection server may include an anomaly score calculator and an anomalous vehicle determiner. The anomaly score calculator may detect a suspicious behavior different from a normal driving behavior based on the content of the event in the received vehicle log and calculate an anomaly score that indicates the likelihood that reverse engineering is being performed on the vehicle corresponding to the vehicle log. The anomalous vehicle determiner may determine the vehicle as an anomalous vehicle if the anomaly score is greater than or equal to a predetermined value.

(17) The foregoing embodiment and the foregoing variations may be combined.

INDUSTRIAL APPLICABILITY

The present disclosure can find its effective use in an information processing device that manages a mobility that is likely to be subjected to a reverse engineering activity performed by an attacker.

The invention claimed is:

1. An anomalous vehicle detection server, comprising:
a processor; and
a memory including at least one set of instructions that, when executed by the processor, causes the processor to perform operations, the operations including:
detecting a suspicious behavior different from a predetermined driving behavior based on pieces of vehicle information received from a plurality of vehicles, respectively, and acquiring an anomaly score of each of the plurality of vehicles, the anomaly score indicating a likelihood that reverse engineering has been performed on the vehicle, the pieces of vehicle information each being based on a vehicle log including content of an event that has occurred in a vehicle system; and
determining whether one vehicle of the plurality of vehicles is an anomalous vehicle based on the anomaly score of the one vehicle and a statistical value of anomaly scores of two or more vehicles of the plurality of vehicles.

2. The anomalous vehicle detection server according to claim 1, wherein
the two or more vehicles include a vehicle of a vehicle type identical to a vehicle type of the one vehicle, and
the operations further include:
comparing the anomaly score of the one vehicle against the statistical value that is based on the anomaly score of the vehicle type identical to the vehicle type of the one vehicle; and
determining whether the one vehicle is the anomalous vehicle based on a comparison result.

3. The anomalous vehicle detection server according to claim 1, wherein
the two or more vehicles include a vehicle located in a same area as an area where the one vehicle is located, and
the operations further include:
comparing the anomaly score of the one vehicle against the statistical value that is based on the anomaly score of the vehicle located in the area identical to the area where the one vehicle is located; and
determining whether the one vehicle is the anomalous vehicle based on a comparison result.

4. The anomalous vehicle detection server according to claim 1, wherein
when an anomalous vehicle type is a vehicle type identical to a vehicle type of the anomalous vehicle and an anomalous area is an area where the anomalous vehicle has been detected,
the operations further include:
determining a degree of progress of an attack in the reverse engineering is a first attack stage when there are no more than a predetermined number of anomalous vehicles that are each the anomalous vehicle and are each of the anomalous vehicle type or when there are no more than the predetermined number of the anomalous vehicles in the anomalous area; and
determining the degree of the progress of the attack in the reverse engineering is a second attack stage more advanced than the first attack stage when there are more than the predetermined number of the anomalous vehicles of the anomalous vehicle type or when there are more than the predetermined number of the anomalous vehicles in the anomalous area.

5. The anomalous vehicle detection server according to claim 4, wherein
the operations further include:
when the processor has determined that the anomalous vehicle type is in the second attack stage, requesting any one or more countermeasures selected from (i) shutting down a network interface, (ii) limiting an address being accessed and an address being accessed from, (iii) limiting a total number of network devices to be connected, (iv) alerting a driver, (v) limiting a network connection, (vi) limiting a vehicle control function, (vii) stopping the vehicle control function from starting, (viii) increasing a frequency at which the vehicle log is transmitted, (ix) increasing a total number of types of the vehicle log, and (x) notifying the driver to be taken on a vehicle of a vehicle type identical to a vehicle type of the vehicle determined to be the anomalous vehicle, based on a value of the anomaly score or a type of the suspicious behavior.

6. The anomalous vehicle detection server according to claim 4, wherein
the operations further include:
when the processor has determined that the anomalous vehicle is in the second attack stage in the anomalous area, requesting any one or more countermeasures selected from (i) shutting down a network interface, (ii) limiting an address being accessed and an address being accessed from, (iii) limiting a total number of network devices to be connected, (iv) alerting a driver, (v) limiting a network connection, (vi) limiting a vehicle control function, (vii) stopping the vehicle control function from starting, (viii) increasing a frequency at which the vehicle log is transmitted, (ix) increasing a total number of types of the vehicle log, and (x) notifying the driver to be taken on a vehicle, other than the anomalous vehicle, that is located in the anomalous area, based on a value of the anomaly score or a type of the suspicious behavior.

7. The anomalous vehicle detection server according to claim 4, wherein
the operations further include:
displaying at least one of a vehicle determined to be the anomalous vehicle, a vehicle type of the vehicle, position information of the vehicle, in response to the anomalous vehicle determiner determining that the anomalous vehicle type is in the first attack stage; and
displaying information indicating that the degree of the progress of the attack is more advanced than the first attack stage, in response to determining that the anomalous vehicle type is in the second attack stage.

8. The anomalous vehicle detection server according to claim 1, wherein
the operations further include:
calculating the anomaly score based on the content of the event included in the vehicle log;
detecting, as the suspicious behavior, any one of a frequent occurrence of a network device connection, an internet connection anomaly, a frequent occurrence of a diagnosis command, a change in an address being accessed, and a change in an address being accessed from, based on the content of the event;
determining that the suspicious behavior is a network analysis activity in response to detecting the suspicious behavior; and
increasing the anomaly score of the one vehicle.

9. The anomalous vehicle detection server according to claim 8, wherein
the operations further include:
in response to determining that the suspicious behavior is the network analysis activity, causing any one or more of (i) shutting down a network interface, (ii) limiting the address being accessed and the address being accessed from, (iii) limiting a total number of connections of the network device, and (iv) alerting a driver to be implemented in accordance with a value of the anomaly score.

10. The anomalous vehicle detection server according to claim 1, wherein
the operations further include:
calculating the anomaly score based on the content of the event included in the vehicle log;
detecting, as the suspicious behavior, any one of a frequent occurrence of a vehicle control function, a frequent occurrence of a system error, a deletion of a system error, a frequent occurrence of a malfunction code, a system login, and a change in a file count or in a process count, based on the content of the event;
determining that the suspicious behavior is a system analysis activity in response to detecting the suspicious behavior; and
increasing the anomaly score of the one vehicle.

11. The anomalous vehicle detection server according to claim 10, wherein
the operations further include:
in response to determining that the suspicious behavior is the system analysis activity, causing any one or more of (i) stopping the vehicle control function from starting, (ii) increasing a frequency at which the vehicle log is transmitted, (iii) increasing a total number of types of the vehicle log, and (iv) alerting a driver to be implemented in accordance with a value of the anomaly score.

12. The anomalous vehicle detection server according to claim 1, wherein
the operations further include:
in a case where the suspicious behavior has been detected, refraining from increasing the anomaly score when the suspicious behavior is detected again within a predetermined period that is based on a time at which the suspicious behavior has been detected or when the suspicious behavior is detected in a predetermined area.

13. The anomalous vehicle detection server according to claim 1, wherein
the operations further include:
lowering the anomaly score when, in a vehicle in which the suspicious behavior has been detected, the suspicious behavior is not detected again within a predetermined period that is based on a time at which the suspicious behavior has been detected.

14. The anomalous vehicle detection server according to claim 1, wherein
the operations further include:
requesting any one or more countermeasures selected from (i) shutting down a network interface, (ii) limiting an address being accessed and an address being accessed from, (iii) limiting a total number of network devices to be connected, (iv) alerting a driver, (v) limiting a network connection, (vi) limiting a vehicle control function, (vii) stopping the vehicle control function from starting, (viii) increasing a frequency at which the vehicle log is transmitted, (ix) increasing a total number of types of the vehicle log, and (x) notifying the driver to be taken on a vehicle of the anomalous vehicle, based on a value of the anomaly score or a type of the suspicious behavior.

15. The anomalous vehicle detection server according to claim 1, wherein
the operations further include:
displaying, in a list form, anomalous vehicles in a descending order of the anomaly score, the anomalous vehicles each being the anomalous vehicle.

16. The anomalous vehicle detection server according to claim 1, wherein
the operations further include:
displaying, on a map, position information of a vehicle determined to be the anomalous vehicle.

17. An anomalous vehicle detection method, comprising:
detecting a suspicious behavior different from a predetermined driving behavior based on pieces of vehicle information received from a plurality of vehicles, respectively, and acquiring an anomaly score of each of the plurality of vehicles, the anomaly score indicating a likelihood that reverse engineering is performed on the vehicle, the pieces of vehicle information each being based on a vehicle log including content of an event that has occurred in a vehicle system provided in the vehicle; and
determining whether one vehicle of the plurality of vehicles is an anomalous vehicle based on the anomaly score of the one vehicle and a statistical value of anomaly scores of two or more vehicles of the plurality of vehicles.

* * * * *